US010471779B2

(12) United States Patent
Masago

(10) Patent No.: US 10,471,779 B2
(45) Date of Patent: Nov. 12, 2019

(54) TIRE WEAR AMOUNT ESTIMATING METHOD AND TIRE WEAR AMOUNT ESTIMATING APPARATUS

(71) Applicant: BRIDGESTONE CORPORATION, Tokyo (JP)

(72) Inventor: Takeshi Masago, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 234 days.

(21) Appl. No.: 15/563,126

(22) PCT Filed: Mar. 24, 2016

(86) PCT No.: PCT/JP2016/059289
§ 371 (c)(1),
(2) Date: Sep. 29, 2017

(87) PCT Pub. No.: WO2016/158630
PCT Pub. Date: Oct. 6, 2016

(65) Prior Publication Data
US 2018/0079262 A1 Mar. 22, 2018

(30) Foreign Application Priority Data

Mar. 31, 2015 (JP) ................................. 2015-073098

(51) Int. Cl.
*B60C 11/24* (2006.01)
*B60C 19/00* (2006.01)
(Continued)

(52) U.S. Cl.
CPC ............ *B60C 11/243* (2013.01); *B60C 11/24* (2013.01); *B60C 11/246* (2013.01); *B60C 19/00* (2013.01);
(Continued)

(58) Field of Classification Search
CPC .......................... B60C 11/243; B60C 11/246
See application file for complete search history.

(56) References Cited

U.S. PATENT DOCUMENTS 8,371,159 B2 * 2/2013 Morinaga ............... B60C 11/24
73/146
8,483,976 B2 * 7/2013 Morinaga ............... B60C 11/24
702/189
(Continued)

FOREIGN PATENT DOCUMENTS

EP 2 172 759 A1 4/2010
EP 2 301 769 A1 3/2011
(Continued)

OTHER PUBLICATIONS

Translation of Written Opinion of the International Searching Authority dated Jun. 21, 2016, in counterpart International Application No. PCT/JP2016/059289 (original document submitted on Sep. 29, 2017).
(Continued)

Primary Examiner — Jill E Culler
Assistant Examiner — Leo T Hinze
(74) Attorney, Agent, or Firm — Sughrue Mion, PLLC

(57) ABSTRACT

A method and apparatus capable of estimating a tire wear amount even on snow-covered road surfaces accurately and reliably are provided. To that end, a differentiated acceleration waveform of a radial acceleration waveform of a tire is obtained, and an operation of calculating a leading-end differentiated peak value and a trailing-end differentiated peak value from the differentiated acceleration waveform is repeated a plurality of times. At the same time, a differentiated peak ratio, which is a ratio between the leading-end differentiated peak value and the trailing-end differentiated peak value, is calculated for each of the leading-end differentiated peak values and the trailing-end differentiated peak
(Continued)

values obtained. Either one of the leading-end differentiated peak values and the trailing-end differentiated peak values, having a differentiated peak ratio within a lower limit range of 0.6 to 0.8 and an upper limit range of 1.0 to 1.2, or computed values of the leading-end differentiated peak values and the trailing-end differentiated peak values are extracted as the differentiated peak values for wear estimation. And the tire wear amount is estimated using the plurality of extracted differentiated peak values for wear estimation.

12 Claims, 12 Drawing Sheets

(51) Int. Cl.
    *B60C 23/06*     (2006.01)
    *G01B 21/00*     (2006.01)
    *G01M 17/02*     (2006.01)

(52) U.S. Cl.
    CPC .............. *B60C 23/06* (2013.01); *G01B 21/00* (2013.01); *G01M 17/02* (2013.01); *B60C 2200/04* (2013.01)

(56) References Cited

U.S. PATENT DOCUMENTS

| | | |
|---|---|---|
| 2010/0186492 A1 | 7/2010 | Morinaga |
| 2011/0118989 A1 | 5/2011 | Morinaga |

FOREIGN PATENT DOCUMENTS

| | | |
|---|---|---|
| JP | 2010-159031 A | 7/2010 |
| JP | 2011168211 A | 9/2011 |
| JP | 2011-203017 A | 10/2011 |
| JP | 2013-136297 A | 7/2013 |
| JP | 2013-169816 A | 9/2013 |
| WO | 2009/008502 A1 | 1/2009 |
| WO | 2009/157516 A1 | 12/2009 |

OTHER PUBLICATIONS

Communication dated Mar. 2, 2018, from European Patent Office in counterpart application No. 16772511.8.

\* cited by examiner

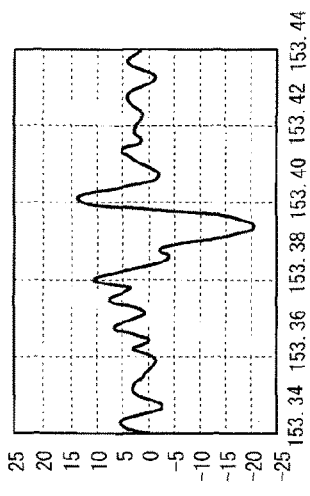
FIG.4A
ACCELERATION [G]
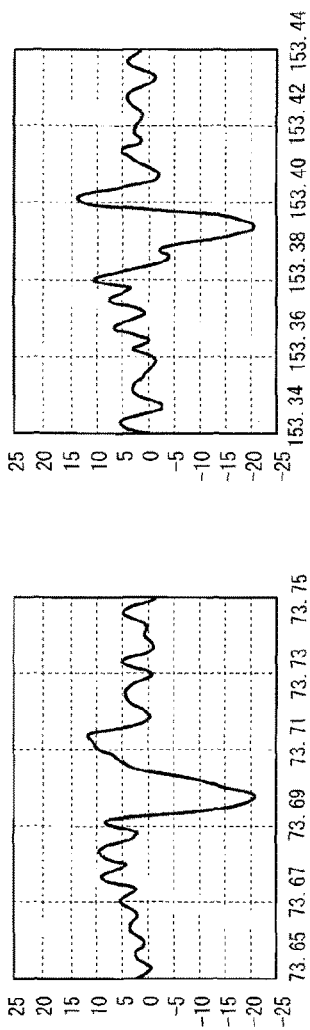
DIFFERENTIATED
ACCELERATION [G/sec.]
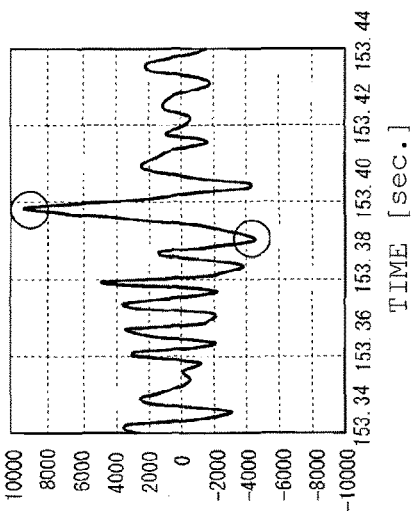
FIG.4B
ACCELERATION [G]
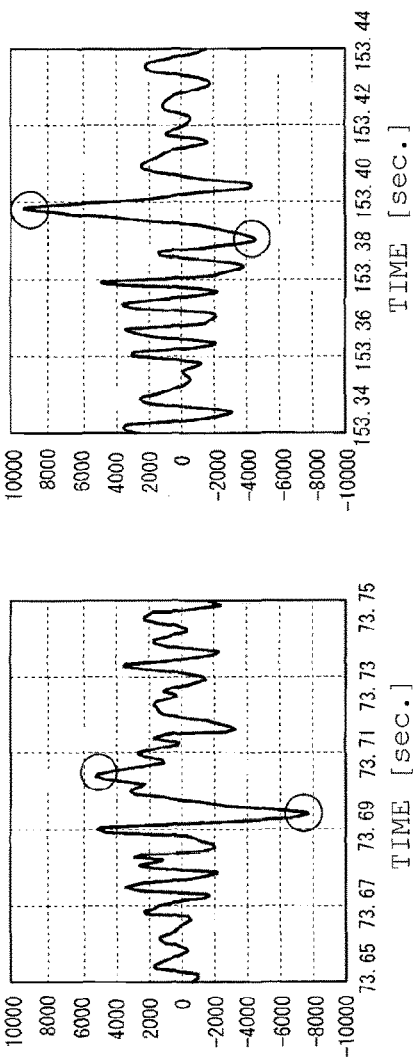
DIFFERENTIATED
ACCELERATION [G/sec.]
FIG.4C
ACCELERATION [G]
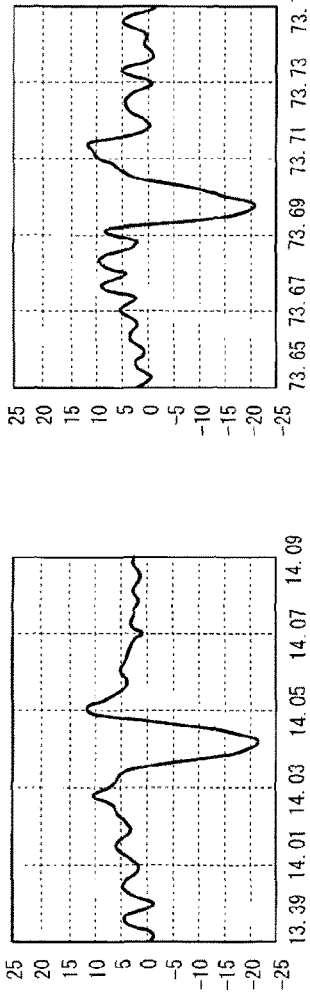
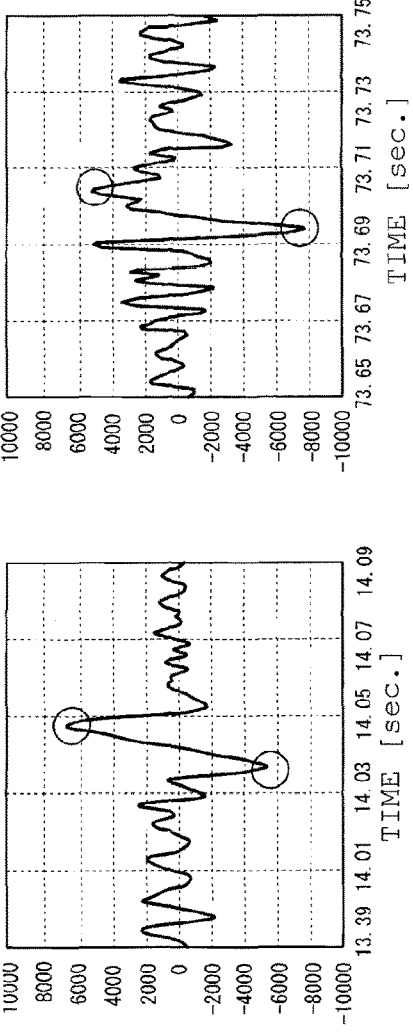
DIFFERENTIATED
ACCELERATION [G/sec.]

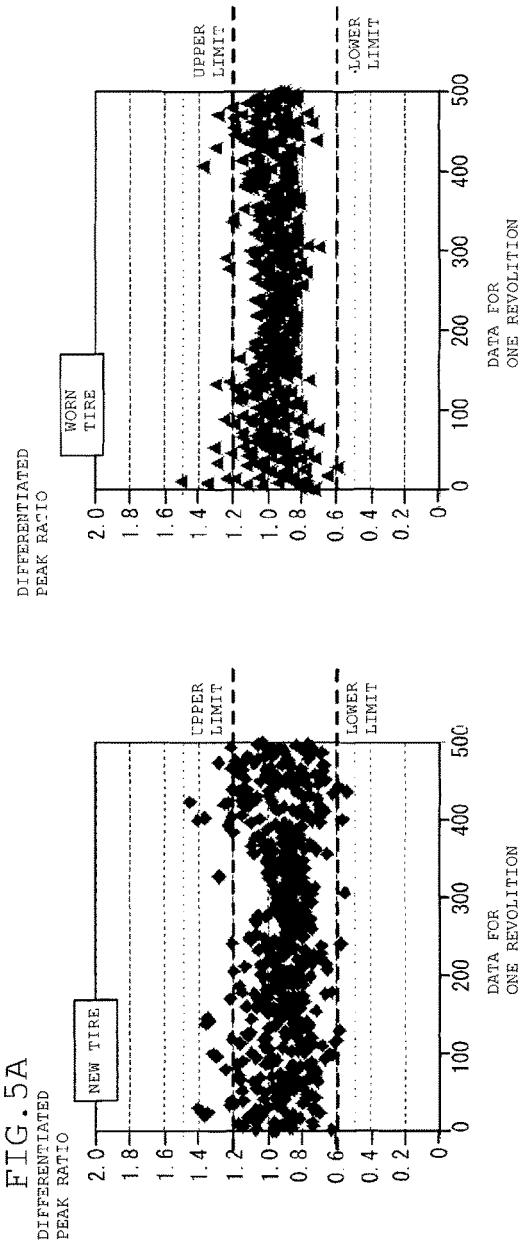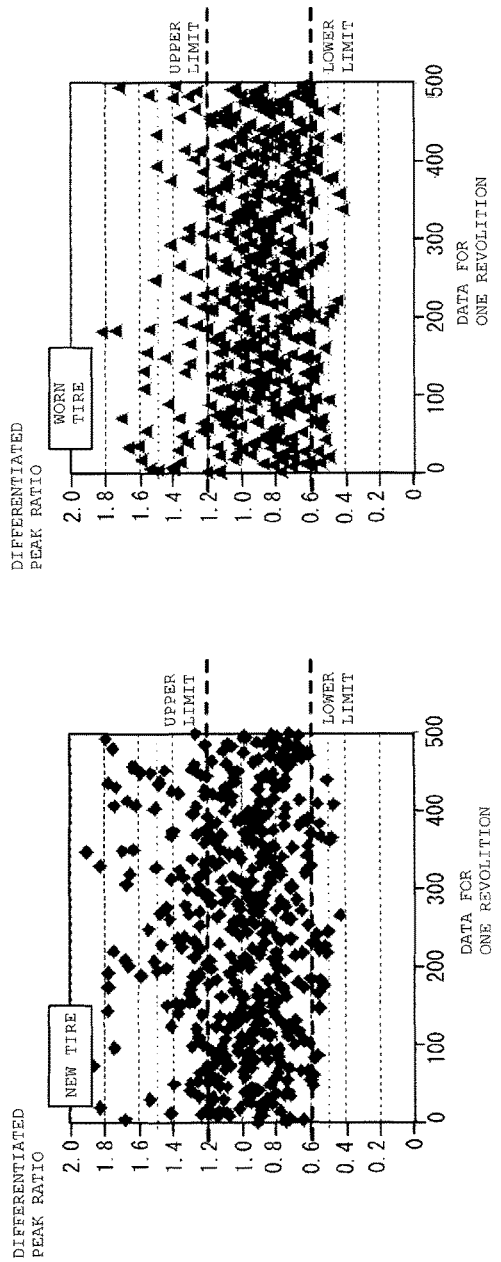
FIG. 5A
FIG. 5B

DIFFERENTIATED PEAK VALUE FOR WEAR ESTIMATION

BAND VALUE FOR WEAR ESTIMATION

NUMBER OF DIFFERENTIATED PEAKS

MEAN DIFFERENTIATED PEAK VALUE

BAND VALUE FOR WEAR ESTIMATION

MEAN DIFFERENTIATED PEAK VALUE

BAND VALUE
FOR WEAR ESTIMATION

REFERENCE DIFFERENTIATED PEAK VALUE

BAND VALUE
FOR WEAR ESTIMATION

BAND VALUE FOR WEAR ESTIMATION $P_{zi}$ [a.u.]

REFERENCE DIFFERENTIATED PEAK VALUE V (BAND VALUE=2)

TIRE WEAR AMOUNT ESTIMATING METHOD AND TIRE WEAR AMOUNT ESTIMATING APPARATUS

CROSS REFERENCE TO RELATED APPLICATIONS

This application is a National Stage of International Application No. PCT/JP2016/059289 filed Mar. 24, 2016, claiming priority based on Japanese Patent Application No. 2015-073098 filed Mar. 31, 2015, the contents of all of which are incorporated herein by reference in their entirety.

BACKGROUND OF THE INVENTION

1. Field of the Invention

The present invention relates to a method for estimating a tire wear amount using output signals of an acceleration sensor disposed on an inner side of a tire tread.

2. Description of the Related Art

In a conventionally proposed method for estimating a tire wear amount, an acceleration sensor is disposed at an axial center of the inner liner of a tire, and pre-leading-end band values, which are magnitudes of vibration levels before a leading end of a contact patch, calculated from a radial acceleration waveform detected by the acceleration sensor. At the same time, a differentiated peak value, which is a peak value at a contact patch end of the same differentiated acceleration waveform, is calculated. And the tire wear amount is estimated from the calculated pre-leading-end band values and differentiated peak value (see Patent Document 1, for instance).

RELATED ART DOCUMENT

Patent Document

Patent Document 1: Japanese Unexamined Patent Application Publication No. 2013-169816

SUMMARY OF THE INVENTION

Problem to be Solved by the Invention

However, the method disclosed in Patent Document 1 has a problem that the accuracy in estimating a tire wear amount drops when a vehicle travels on snow-covered road surfaces.

The present invention has been made in view of the foregoing problem, and an object of the invention is to provide a method and apparatus capable of estimating the tire wear amount accurately and reliably even on snow-covered road surfaces.

Means for Solving the Problem

The inventor of the present invention has discovered through intensive investigations that the acceleration waveform can become disturbed by the unevenness of snow-covered road surfaces (hereinafter referred to as "snowy roads") and as a result there occur differences between leading-end differentiated peak values and trailing-end differentiated peak values. He has further discovered that the accuracy in estimating the tire wear amount can be further improved if no use is made of the differentiated peak values calculated from such disturbed acceleration waveform in the estimation of wear amount.

That is, the present invention provides a method for estimating the tire tread wear amount from the radial acceleration of the tire detected using an acceleration sensor. The method includes the steps of (A) detecting a radial acceleration of the tire using an acceleration sensor disposed on an inner surface of the tire tread, (B) extracting a radial acceleration waveform of the tire covering a neighborhood of contact patch from the detected radial acceleration, (C) obtaining a differentiated acceleration waveform by differentiating the radial acceleration waveform of the tire, (D) calculating a leading-end differentiated peak value and a trailing-end differentiated peak value, which are the magnitudes of peaks appearing at the two contact patch ends of the differentiated acceleration waveform, from the differentiated acceleration waveform, (E) calculating differentiated peak ratios, which are ratios between leading-end differentiated peak values and trailing-end differentiated peak values, for each of the leading-end differentiated peak values and the trailing end-side differentiated peak values obtained by repeating the steps (A) to (D) a plurality of times, and extracting either one of the leading-end differentiated peak values and the trailing-end differentiated peak values, having the differentiated peak ratio within a lower limit range of 0.6 to 0.8 and an upper limit range of 1.0 to 1.2, or computed values of the leading-end differentiated peak values and trailing-end differentiated peak values, as differentiated peak values for wear estimation, (F) calculating a mean differentiated peak value, which is a mean value of a plurality of differentiated peak values for wear estimation extracted in step (E), and (G) estimating the tire wear amount from the mean differentiated peak value.

Also, the present invention provides a tire wear amount estimating apparatus for estimating the tire tread wear amount from a radial acceleration of the tire detected using an acceleration sensor. The tire wear amount estimating apparatus includes an acceleration sensor disposed on an inner surface of the tire tread for detecting a radial acceleration of the tire, an acceleration waveform extracting means for extracting a radial acceleration waveform of the tire covering a neighborhood of contact patch from the output signals of the acceleration sensor, a differentiation computing means for obtaining a differentiated acceleration waveform by differentiating the radial acceleration waveform of the tire, a differentiated peak value calculating means for calculating a leading-end differentiated peak value and a trailing-end differentiated peak value, which are the peak values at the two contact patch ends of the differentiated acceleration waveform, a differentiated peak ratio calculating means for calculating a differentiated peak ratio, which is a ratio between the leading-end differentiated peak value and the trailing-end differentiated peak value, a data extracting means for extracting either one of the leading-end differentiated peak values and the trailing-end differentiated peak values, having the differentiated peak ratio within a lower limit range of 0.6 to 0.8 and an upper limit range of 1.0 to 1.2, out of the calculated leading-end differentiated peak values and trailing-end differentiated peak values, or computed values of the leading-end differentiated peak values and trailing-end differentiated peak values, as differentiated peak values for wear estimation, a mean differentiated peak value calculating means for calculating a mean differentiated peak value, which is a mean value of the differentiated peak values for wear estimation, a storage means for storing a map representing a relationship between predetermined differentiated peak values and tire wear amount, and a wear amount estimating means for estimating the tire wear amount from the calculated mean differentiated peak value and the map.

It is to be understood that the foregoing summary of the invention does not necessarily recite all of the features essential to the invention, and subcombinations of all these features are intended to be included in the invention.

BRIEF DESCRIPTION OF THE DRAWINGS

FIG. 4A-4C are diagrams showing examples of acceleration waveforms and differentiated acceleration waveforms when a vehicle travels on snow-covered road surfaces.

FIGS. 5A and 5B are diagrams showing the distributions of peak ratios on dry roads and snowy roads.

BEST MODE FOR CARRYING OUT THE INVENTION

Hereinafter, the invention will be described based on preferred embodiments which do not intend to limit the scope of the claims of the present invention. Not all of the combinations of the features described in the embodiments are necessarily essential to the invention.

First Embodiment

Figure 1:
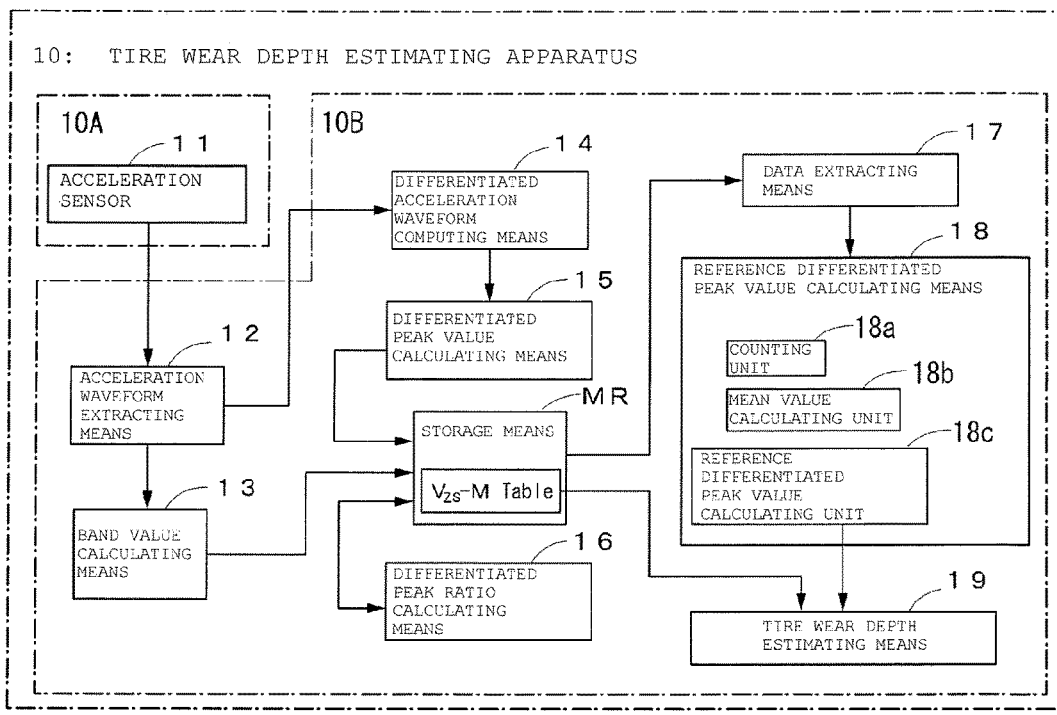
FIG. 1 is a diagram showing a constitution of a tire wear amount estimating apparatus according to a first embodiment of the invention.

FIG. 1 is a functional block diagram showing a constitution of a tire wear amount estimating apparatus 10 according to a first embodiment of the invention. In the figure, the tire wear amount estimating apparatus 10 includes an acceleration sensor 11, an acceleration waveform extracting means 12, a band value calculating means 13, a differentiated acceleration waveform computing means 14, a differentiated peak value calculating means 15, a differentiated peak ratio calculating means 16, a data extracting means 17, a reference differentiated peak value calculating means 18, a tire wear amount estimating means 19, and a storage means MR.

The acceleration sensor 11 constitutes a sensor unit 10A, whereas the respective means from the acceleration waveform extracting means 12 to the tire wear amount estimating means 19 and the storage unit MR21 constitute a storage and computing unit 10B.

The respective means constituting the storage and computing unit 10B, which are disposed on a not-shown vehicle body side, may be constructed of computer software and a storage unit, such as a RAM, for instance.

Figure 2:
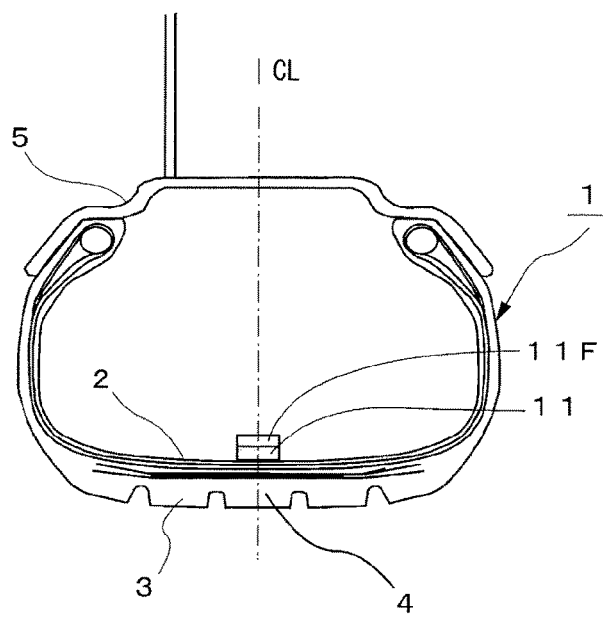
FIG. 2 is an illustration showing an example of location of an acceleration sensor.

The acceleration sensor 11, as shown in FIG. 2, is disposed at the axial center, indicted by CL in the figure, of an inner liner 2 of the tire 1. And the acceleration sensor 11 detects the radial acceleration of the tire acting on the central part 4 of the tire tread 3. It is to be noted that a preferred arrangement for transmitting the output signals to the storage and computing unit 10B may be devised as follows. For example, as shown in FIG. 2, a transmitter 11F may be installed on the inner liner 2 or the wheel 5. And the output signals of the acceleration sensor 11 are each amplified by a not-shown amplifier and then transmitted wirelessly to the storage and computing unit 10B disposed on the vehicle body side. It is also to be noted that the arrangement may be such that the storage and computing unit 10B is disposed on the tire 1 side and the wear amount data estimated by the tire wear amount estimating means 19 is transmitted to a not-shown vehicular control unit on the vehicle body side.

The acceleration waveform extracting means 12 extracts a radial acceleration waveform of the tire (hereinafter referred to as "acceleration waveform"), which is a time-series waveform of the radial acceleration waveform of the tire near the contact patch in the central region 4, from the signals indicating the magnitudes of radial acceleration acting on the central region 4 of the tire tread 3 outputted from the acceleration sensor 11. It is not necessary that the acceleration waveform is that for one revolution of the tire 1, but the acceleration waveform may be of a length including a waveform near the contact patch, for example, about 60% of one revolution.

The band value calculating means 13 calculates pre-leading-end band values P, which are the vibration levels of predetermined specific frequency bands, from the waveform in a pre-leading-end domain of the acceleration waveform extracted by the acceleration waveform extracting means 12, and sends them to the storage means MR.

Figure 3A:
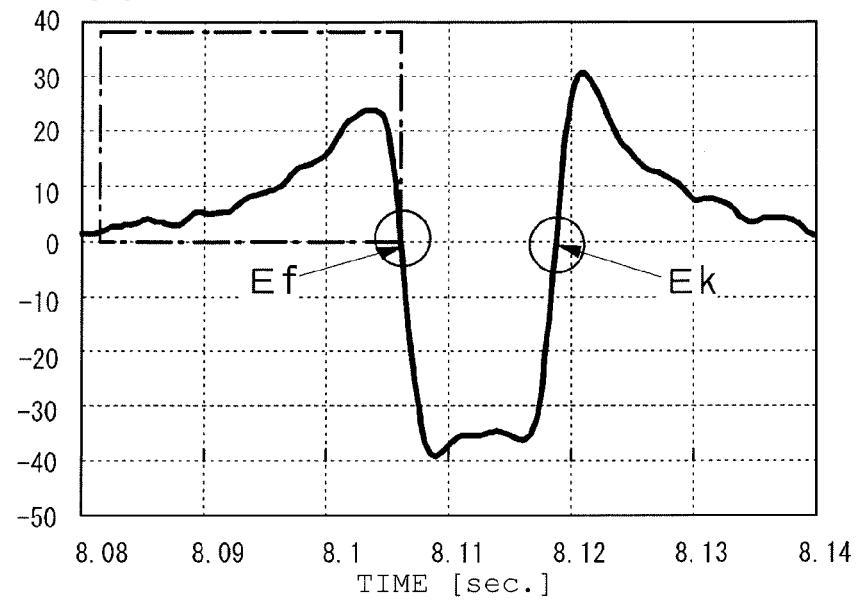
FIGS. 3A and 3B are diagrams showing an example of an acceleration waveform and an example of a differentiated acceleration waveform.

FIG. 3A is a diagram showing an example of acceleration waveform detected by the acceleration sensor 11C. The horizontal axis represents time [sec.], and the vertical axis the magnitude of acceleration [G]. In the acceleration waveform, the magnitude of acceleration is 0 at the two contact patch ends, namely, the leading end $E_f$ in the left-hand circle and the trailing end $E_k$ in the right-hand circle in the figure.

The pre-leading-end band values P can be derived by extracting an acceleration waveform in a predetermined time domain (pre-leading-end domain) before the leading end $E_f$ enclosed by a dot-and-dash line in the figure of the acceleration waveform and finding an RMS mean of the waveform obtained by passing the extracted acceleration waveform through bandpass filters (50 Hz to 1000 Hz).

Figure 3B:
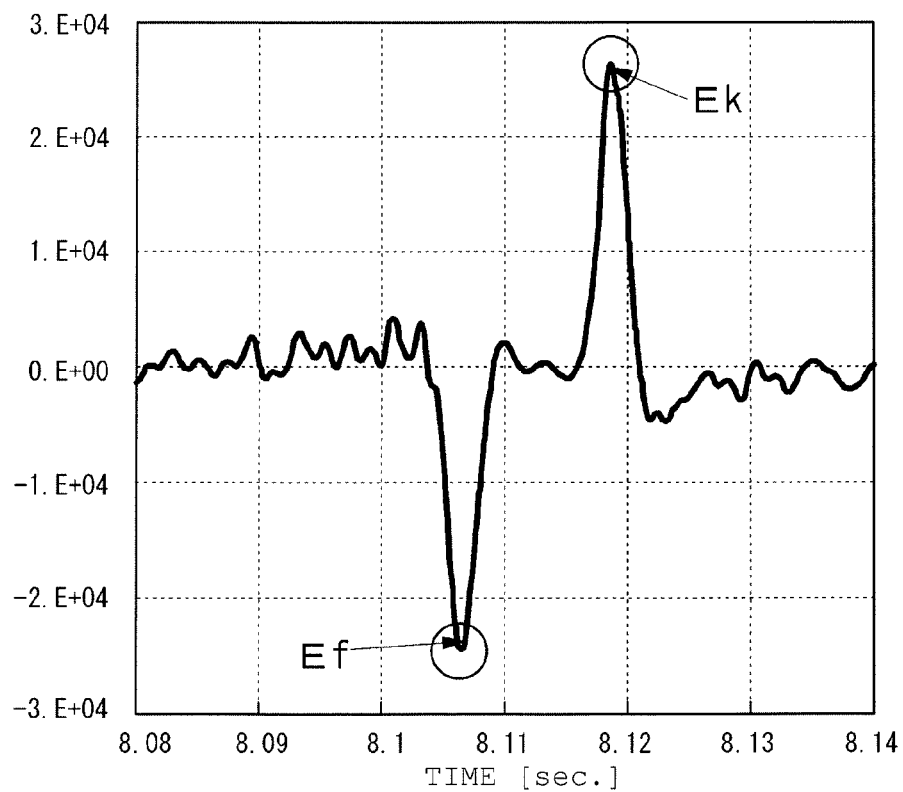

It is to be noted that the positions of the leading end $E_f$ and the trailing end $E_k$ can be derived more accurately from the peak positions of the differentiated acceleration waveform shown in FIG. 3B than from the zero crossing points of the acceleration waveform shown in FIG. 3A.

The differentiated acceleration waveform computing means 14 obtains a differentiated acceleration waveform by temporally differentiating the acceleration waveform extracted by the acceleration waveform extracting means 12.

The differentiated peak value calculating means 15 calculates differentiated peak values, which are the magnitudes of the peaks appearing at the contact patch ends of the differentiated acceleration waveform, from the differentiated acceleration waveform and sends them to the storage means MR.

FIG. 3B shows a differentiated acceleration waveform obtained by differentiating the acceleration waveform shown in FIG. 3A. The horizontal axis represents time [sec.], and the vertical axis the magnitude of differentiated acceleration [G/sec.]. As shown in the diagram, the differentiated acceleration waveform has major peaks at the leading end $E_f$ and the trailing end $E_k$ of the contact patch, respectively.

Hereinbelow, the magnitude of the differentiated acceleration at the leading end $E_f$ will be referred to as the leading-end differentiated peak value $V_f$, and the magnitude of the differentiated acceleration at the trailing end $E_f$ as the trailing-end differentiated peak value $V_k$.

The differentiated peak ratio calculating means 16 calculates differentiated peak ratios ($R=V_f/V_k$), which are each a ratio between the leading-end differentiated peak value $V_f$ and the trailing-end differentiated peak value $V_k$ stored in the storage means MR, and sends them to the storage means MR.

The data extracting means 17 extracts only the leading-end differentiated peak values $V_f$, having the differentiated peak ratio $R=V_f/V_k$ within a range of 0.6 to 1.2, out of the leading-end differentiated peak values $V_f$ calculated by the differentiated peak value calculating means 15 and stored in the storage means MR and sends them as the leading-end differentiated peak values $V_z$ for wear estimation to the storage means MR. At the same time, the data extracting means 17 sends the pre-leading-end band values P, which are calculated from the acceleration waveform before the differentiation of the differentiated peak values $V_z$ for wear estimation, out of the pre-leading-end band values P calculated by the band value calculating means 13 and stored in the storage means MR, as the band values Pz for wear estimation to the storage means MR.

It should be appreciated here that, as shown in FIG. 4A, the leading-end differentiated peak value $V_f$ and the trailing-end differentiated peak value $V_k$ normally take nearly the same value even when the vehicle is travelling on a snow-covered road. However, if the unevenness of the surface of a well-run-over snow, for instance, exceeds a certain level, there will be conspicuous disturbances in the acceleration waveform as shown in the upper diagrams of FIGS. 4B and 4C with the results of greater differences between the leading-end differentiated peak value $V_f$ and the trailing-end differentiated peak value $V_k$ as shown in the lower diagrams of FIGS. 4B and 4C.

When there are disturbances in the acceleration waveform, there are cases where $V_f > V_k$ as shown in the lower diagram of FIG. 4B and cases where $V_f < V_k$ as shown in the lower diagram of FIG. 4C.

Using differentiated peak values derived from such a disturbed acceleration waveform as data for wear amount estimation may result in an accuracy drop in wear amount estimation. In the present example, therefore, the differentiated peak ratios ($R=V_f/V_k$), which are each a ratio between the leading-end differentiated peak value $V_f$ and the trailing-end differentiated peak value $V_k$, are employed as the measure of data reliability.

As shown in FIG. 5A, when the vehicle travels on a dry road surface, worn tires as shown on the left side of the figure show the differentiated peak ratios $R=V_f/V_k$ in a range of 0.6 to 1.2 in the same way as with new tires as shown on the right side of the figure. In contrast to this, when the vehicle travels on a snowy road, as shown in FIG. 5B, both the new tires on the left side of the figure and worn tires on the right side of the figure show great variation in the differentiated peak ratio ($R=V_f/V_k$).

In the present example, therefore, the data only in the range of the differentiated peak ratio $R=V_f/V_k$ being 0.6 to 1.2 are used for wear estimation.

The reference differentiated peak value calculating means 18 includes a counting unit 18a for counting the differentiated peak values $V_z$ for wear estimation stored in the storage means MR for each pre-leading-end band value $P_z$, a mean value calculating unit 18b for calculating a mean differentiated peak value, which is a mean value of differentiated peak values for wear estimation, and a reference differentiated peak value calculating unit 18c.

The differentiated peak value $V_z$ for wear estimation is obtained for each of the band values $P_z$ for wear estimation. However, in counting the number of the differentiated peak values $V_z$ for wear estimation, the counting unit 18a takes the band values $P_z$ for wear estimation as discrete band values $P_{zi}$ (i=1 to n) for wear estimation having a predefined level width Δ and counts the differentiated peak values $V_z$ for wear estimation corresponding to the band values $P_z$ for wear estimation within a domain of $[P_{zi}-\Delta/2, P_{zi}+\Delta/2]$ centered around the discrete band values $P_{zi}$ for wear estimation as the differentiated peak values $V_{zi}$ for wear estimation corresponding to the band values $P_{zi}$ for wear estimation.

The mean value calculating unit 18b calculates a mean differentiated peak value $V_{zi-ave}$, which is a mean value of N units of differentiated peak value $V_{zij}$, when the number of differentiated peak values $V_{zi}$ counted reaches N. Here $V_{zi-ave}=(V_{zi1}+V_{zi1}+ \ldots +V_{zij}+ \ldots +V_{ziN})$.

The mean differentiated peak value $V_{zi-ave}$, is calculated for each of the pre-leading-end band values $P_{zi}$.

The reference differentiated peak value calculating unit 18c calculates a mean value of the mean differentiated peak values $V_{zi-ave}$ for each of the pre-leading-end band values $P_{zi}$ calculated by the reference differentiated peak value calculating means 18 and sends the mean value as the reference differentiated peak value $V_{zs}$ to the tire wear amount estimating means 19.

Here $V_{zs}=(V_{z1-ave}+V_{z2-ave}+ \ldots +V_{zi-ave}+ \ldots +V_{zn-ave})$.

The storage means MR stores not only the pre-leading-end band values P, leading-end differentiated peak values $V_f$, trailing-end differentiated peak values $V_k$, differentiated peak ratios R, leading-end differentiated peak values $V_z$ for wear estimation, and band values $P_z$ for wear estimation, but also a $V_{zs}$-M map 10M representing a relationship between predetermined reference differentiated peak values $V_{zk}$ and tire wear amount M.

The tire wear amount estimating means 19 estimates the wear amount of the tire 1 from the reference differentiated peak value $V_{zs}$ calculated by the reference differentiated peak value calculating means 18 and the $V_{zs}$-M map 10M stored in advance in the storage means MR.

Figure 6:
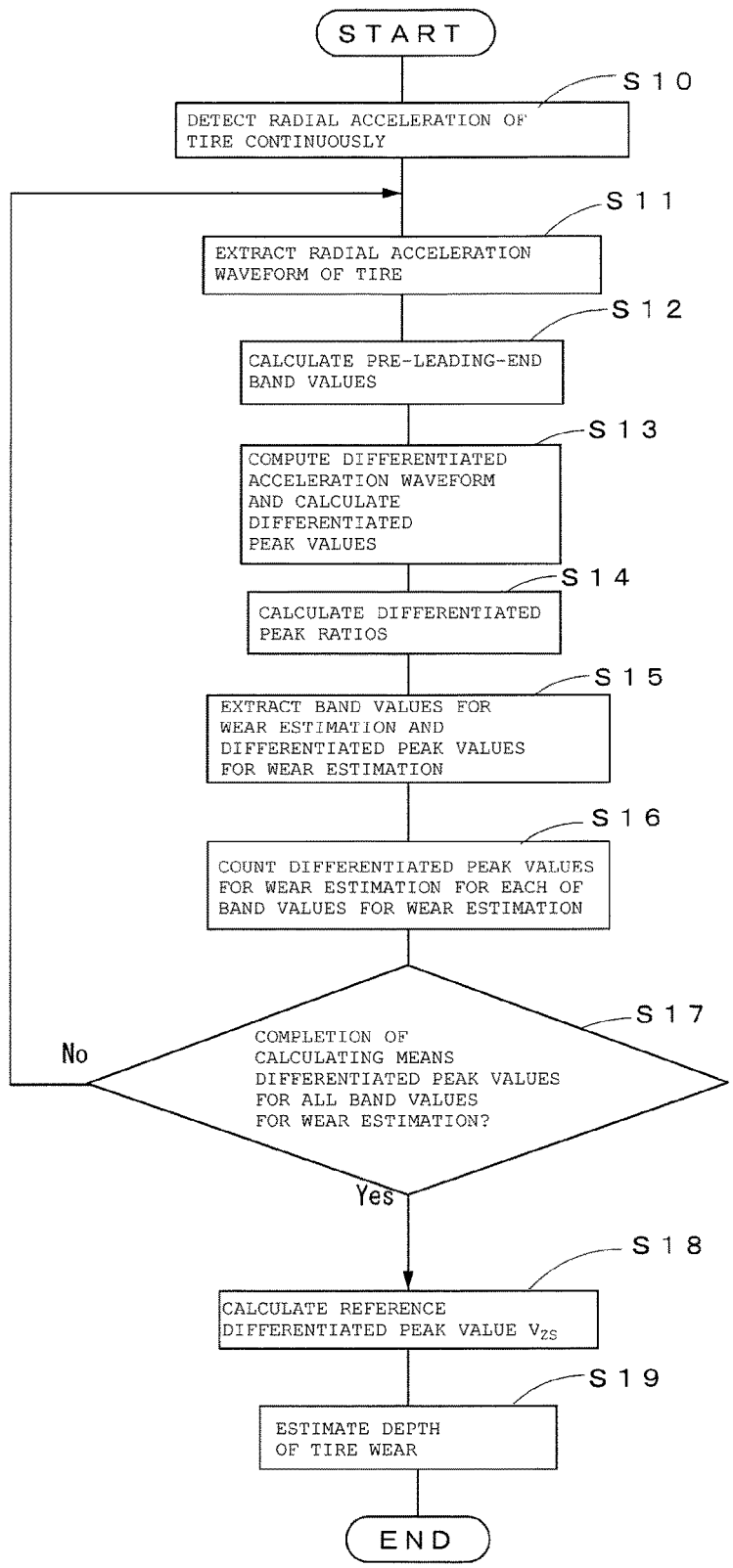
FIG. 6 is a flowchart showing a method for estimating the tire wear amount according to the first embodiment.

Next, a description is given of a method for estimating tire wear amount using a tire wear amount estimating apparatus 10 with reference to the flowchart of FIG. 6.

First a radial acceleration of the tire at the inner surface of the inner liner 2 deformed together with the deformation of the tire tread 3 by an acceleration sensor 11. The radial acceleration of the tire thus detected is then amplified and transmitted from a transmitter 11F disposed on the inner liner 2 to a storage and computing unit 10B disposed on the vehicle body side (step S10).

At the storage and computing unit 10B, an acceleration waveform is extracted from the signals indicating the magnitudes of radial acceleration of the tire acting on the tire tread 3 outputted continuously from the acceleration sensor 11 (step S11), and pre-leading-end band values P, which are the vibration levels in predetermined specific frequency bands (e.g., 50 Hz to 1000 Hz) are calculated from the waveform in a pre-leading-end domain of the extracted acceleration waveform (step S12).

Next, a differentiated acceleration waveform is computed by temporally differentiating the acceleration waveform, and then a leading-end differentiated peak value $V_f$, which is a peak value on the leading-end side of the contact patch, and a trailing-end differentiated peak value $V_k$, which is a peak value on the trailing-end side of the contact patch, are calculated from the differentiated acceleration waveform (step S13).

Then differentiated peak ratios $R=V_f/V_k$, which are each a ratio between the leading-end differentiated peak value $V_f$ and the trailing-end differentiated peak value $V_k$, are calculated (step S14). After that, only the leading-end differentiated peak values, having the differentiated peak ratio $R=V_f/V_k$ within a range of 0.6 to 1.2, are extracted as the differentiated peak value $V_z$ for wear estimation, and at the same time the pre-leading-end band values P calculated from the acceleration waveform before the differentiation of the differentiated acceleration waveform for calculating the differentiated peak values $V_z$ for wear estimation are extracted as band values $P_z$ for wear estimation out of the pre-leading-end band values P calculated in step S12 (step S15).

Next, the differentiated peak values $V_z$ for wear estimation are counted for each of the band values $P_z$ for wear estimation (step S16).

Figure 7A:
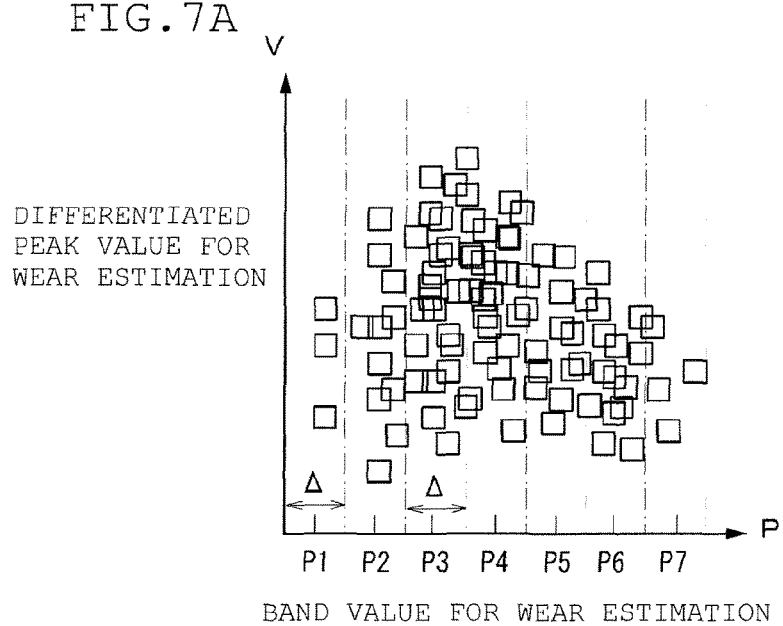
FIG. 7A-7C are diagrams for explaining a method for calculating a mean differentiated peak value.
Figure 7B:
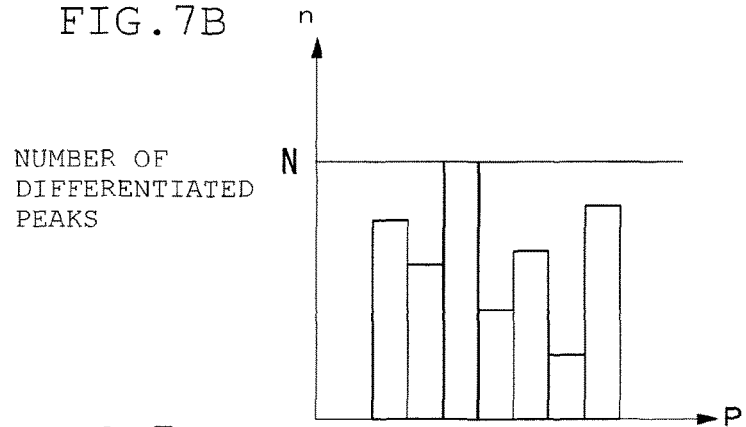
Figure 7C:
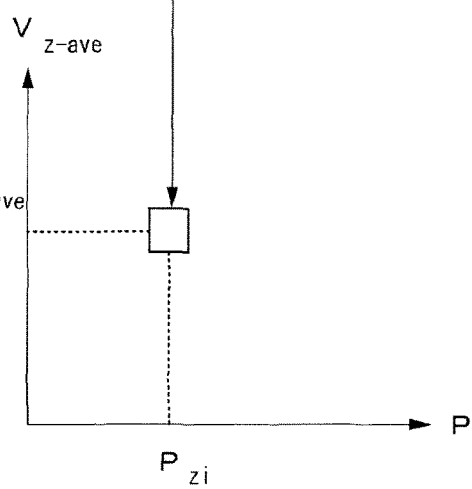

FIG. 7A shows a graph generated with the horizontal axis representing the band value $P_z$ for wear estimation and the vertical axis the differentiated peak value $V_z$ for wear estimation. As shown, the number of differentiated peak values $V_{zi}$ for wear estimation to be found in the domains with the level width being $\Delta$ having the band value $P_{zi}$ for wear estimation at the center, which are domains $[P_{zi}-\Delta/2, P_{zi}+\Delta/2]$, varies with the band value $P_{zi}$ for wear estimation. In the present example, therefore, as shown in FIG. 7B, a histogram of the horizontal axis being the band values $P_{zi}$ for wear estimation and the vertical axis being the differentiated peak values $V_{zi}$ for wear estimation to be found in the respective domains $[P_{zi}-\Delta/2, P_{zi}+\Delta/2]$ is generated to make up the numbers of the differentiated peak values $V_{zi}$ for wear estimation to be found in the respective domains. And the numbers of the differentiated peak values $V_{zi}$ for wear estimation to be found in the respective domains to be found in the respective domains $[P_{zi}-\Delta/2, P_{zi}+\Delta/2]$ are counted (note i=1 to m, m being the number of divisions of the band value $P_{zi}$ for wear estimation).e In step S17, it is determined for each domain $[P_{zi}-\Delta/2, P_{zi}+\Delta/2]$ whether the number n of the differentiated peak values $V_{zi}$ for wear estimation to be found in the domain $[P_{zi}-\Delta/2, P_{zi}+\Delta/2]$ has reached N or not. And when there is any domain $[P_{zi}-\Delta/2, P_{zi}+\Delta/2]$ which has reached N, the mean differentiated peak value $V_{iz-ave}$ which is the mean value of the N units of differentiated peak values $V_{zi}$ for wear estimation found in the domain $[P_{zi}-\Delta/2, P_{zi}+\Delta/2]$, is calculated as shown in FIG. 7C.

On the other hand, when there is any domain $[P_{zi}-\Delta/2, P_{zi}+\Delta/2]$ where the number of differentiated peak values $V_z$ for wear estimation to be found in the domain has not reached N, the procedure returns to step S11 and the extraction of the acceleration waveform is continued.

That is, in the present example, differentiated peak values $V_{zi}$ for wear estimation are counted for each of the band values $P_{zi}$ for wear estimation in obtaining the mean value of the differentiated peak values $V_{zi}$ for wear estimation. And the operations of steps S11 to S16 are repeated until all of the numbers of the differentiated peak values $V_{zi}$ for wear estimation counted for each of the band values $P_{zi}$ for wear estimation reach N, which is a predetermined number of units. In this manner, mean differentiated peak values $V_{zi-ave}$ are calculated for all the band values $P_{zi}$ for wear estimation.

It is to be noted that the calculation of the mean differentiated peak values $V_{zi-ave}$ may be done only after all of the numbers of the differentiated peak values $V_{zi}$ for wear estimation in the respective domains $[P_{zi}-\Delta/2, P_{zi}+\Delta/2]$ have become N.

The procedure proceeds to step S18 on completion of calculation of the mean differentiated peak values $V_{zi-ave}$ in all the domains $[P_{zi}-\Delta/2, P_{zi}+\Delta/2]$. And a reference differentiated peak value $V_{zs}$, which is the mean value of the differentiated peak values $V_{zi-ave}$ obtained for each of the band values $P_{zi}$ for wear estimation, is calculated.

Figure 8A:
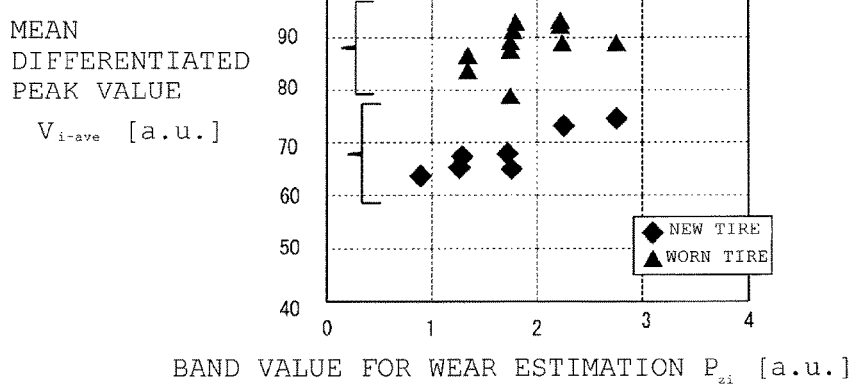
FIGS. 8A and 8B are diagrams showing comparison of mean differentiated peak values between new tires and worn tires.
Figure 8B:
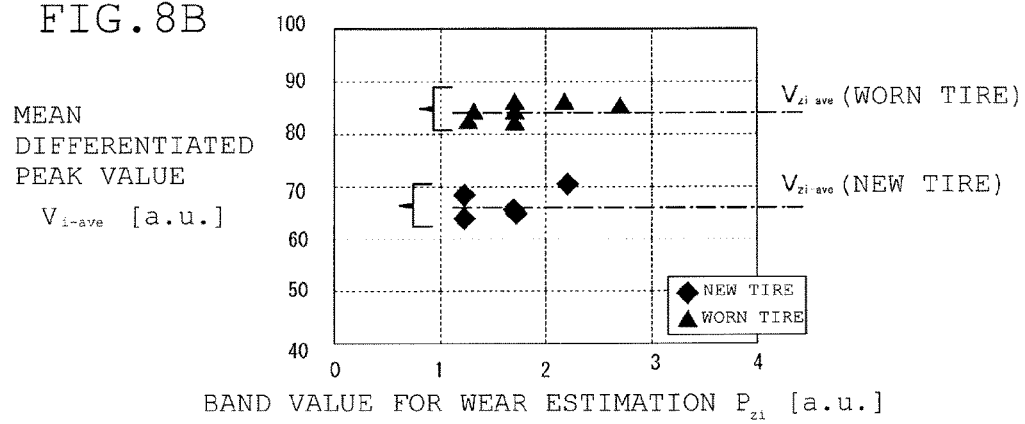

FIG. 8A is a diagram showing a distribution of mean differentiated peak values $V_{zi-ave}$ when no data restriction by the differentiated peak ratios R has been applied. FIG. 8B is a diagram showing a distribution of mean differentiated peak values $V_{zi-ave}$, which are the mean values of differentiated peak values $V_{zi}$ for wear estimation. Of the two diagrams, the horizontal axis represents respective band values $P_{zi}$ for wear estimation, and the vertical axis mean differentiated peak values $V_{i-ave}$. ♦ in the diagrams represents a mean differentiated peak value $V_{zi-ave}$ of a new tire, whereas ▲ represents a mean differentiated peak value $V_{zi-ave}$ of a worn tire.

As is evident from comparison between FIG. 8A and FIG. 8B, there is a significant variation in the distribution of mean differentiated peak value $V_{i-ave}$ whereas there is a smaller variation in the distribution of mean differentiated peak value $V_{iz-ave}$. Accordingly, when the reference differentiated peak value $V_{zs}$, is used as the gauge of tire wear amount, the tire wear amount can be estimated with accuracy if the reference differentiated peak value $V_{zs}$, which is the mean value of the mean differentiated peak value $V_{zi-ave}$ calculated using only the leading-end differentiated peak values $V_f$ within the range of differentiated peak ratio $R=V_f/V_k$ being 0.6 to 1.2, is used.

Finally, the wear amount of the tire 1 is estimated from the reference differentiated peak value $V_{zs}$ and the $V_{zs}$-M map 10M stored in advance in the storage means MR (step S19).

Figure 9:
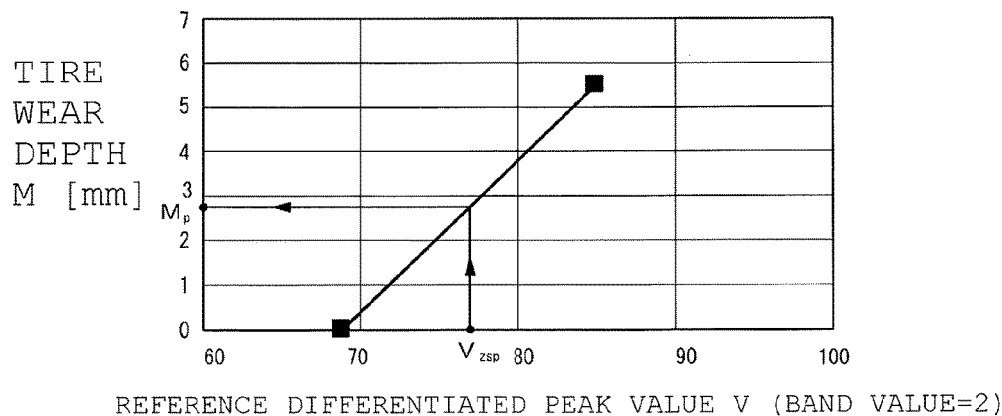
FIG. 9 is a diagram showing an example of $V_{ZS}M$ map 10M.

FIG. 9 is a diagram showing an example of a $V_{zs}$-M map 10M. If the reference differentiated peak value calculated by the reference differentiated peak value calculating means 18 is $V_{zsp}$, the tire wear amount $M_p$ corresponding to the reference differentiated peak value $V_{zsp}$ circled on the horizontal axis of the diagram is the wear amount of the tire 1.

It is to be noted that the $V_{zs}$-M map 10M can be created by obtaining the reference differentiated peak values $V_{zs}$ of various test tires subjected to various tests. In such tests, the test tires, which are new tires and worn tires having a plurality of different wear amounts M with an acceleration sensor installed thereon, are subjected to various tests as vehicles fitted with these test tires are operated on the road with a variety of road surface conditions.

It is to be noted that, in the foregoing first embodiment, the leading-end differentiated peak values $V_f$, having the differentiated peak ratio $R=V_f/V_k$ within a range of 0.6 to 1.2, are used as the differentiated peak values $V_z$ for wear estimation. However, the arrangement may be such that the trailing-end differentiated peak values $V_k$, having the differentiated peak ratio $R=V_f/V_k$ within a range of 0.6 to 1.2, are used or that computed values, such as the mean values (mean values of absolute values) of the leading-end differentiated peak values $V_f$ and the trailing-end differentiated peak values $V_k$, having the differentiated peak ratio $R=V_f/V_k$ within a range of 0.6 to 1.2, are used as the differentiated peak values $V_z$ for wear estimation.

Also, in the foregoing embodiment, the leading-end differentiated peak values $V_f$, having the differentiated peak ratio $R=V_f/V_k$ within a range of 0.6 to 1.2, are used as the differentiated peak values $V_z$ for wear estimation. However, the present invention is not limited thereto. It is valid as long as the differentiated peak ratio is within a lower limit range of 0.6 to 0.8 and an upper limit range of 1.0 to 1.2.

Also, in the foregoing first embodiment, the tire wear amount is estimated from the reference differentiated peak value $V_{zs}$ and the $V_{zs}$-M map 10M. However, tire wear amount may be estimated by comparing the reference differentiated peak value $V_{zs}$ against a predetermined threshold value.

More specifically, the reference differentiated peak value $V_{zs}$ calculated by the reference differentiated peak value calculating means 18 may be compared with the predetermined threshold value K. And if $V_{zs}<K$, the wear amount may be estimated to be small (e.g., wear amount being less than 5 mm), and if $V_{zs} \geq K$, it may be estimated to be large (e.g., wear amount being 5 mm or more).

Or, for example, a plurality of threshold values, such as $K_1<k_2$, may be set. Then if $V_{zs}<K_1$, the wear amount may be determined to be small (wear amount being less than 3 mm), if $K_1 \leq V_{zs}<K_2$, it may be determined to be intermediate (wear amount being 3 mm or more and less than 5 mm), and if $V_{zs} \geq K_2$, it may be determined to be large (wear amount being 5 mm or more).

Also, in the foregoing embodiment, the mean value of the mean differentiated peak values $V_{zi-ave}$ for each of the pre-leading-end band values $P_{zi}$ is employed as the reference differentiated peak value $V_{zs}$. However, the mean differentiated peak values $V_{zi-ave}$ corresponding to predetermined reference band values $P_{zn}$ for wear estimation may be employed as the reference differentiated peak value $V_{zs}$.

Also, in the foregoing embodiment, a single acceleration sensor 11 is disposed at the axial center of the inner liner 2 of the tire 1. However, a plurality of acceleration sensors may be disposed instead. Particularly with a tire having a tire tread 3 with a groove in the axial center thereof, it is preferable if the acceleration sensors are disposed one on each of the right and left symmetrical positions from the axial center of the inner liner 2 radially inside of the land portions of the tire tread 3. And the tire wear amount may be estimated from the tire wear amount estimated from the acceleration waveform detected by the right-hand acceleration sensor and the tire wear amount estimated from the acceleration waveform detected by the left-hand acceleration sensor.

Also, in the foregoing embodiment, the pre-leading-end band values $P_i$ are obtained by deriving RMS mean values by passing the acceleration waveform in the pre-leading-end domain through bandpass filters (50 to 1000 Hz). However, a Fast Fourier Transform (FFT) may be performed on the acceleration waveform in the pre-leading-end domain to find the magnitudes of frequency components in the frequency bands of 50 to 1000 Hz, and the magnitudes of the frequency components may be employed as the pre-leading-end band values.

Second Embodiment

In the foregoing first embodiment, the tire wear amount is estimated from the reference differentiated peak value $V_{zs}$, which is the mean value of the mean differentiated peak values $V_{zi-ave}$ found for each of the band values $P_{zi}$ for wear estimation, and the $V_{zs}$-M map. However, the accuracy in estimation of wear amount can be further improved if an approximation formula representing a relationship between the band values $P_{zi}$ for wear estimation and the mean differentiated peak values $V_{zi-ave}$, or an approximation line derived by plotting the mean differentiated peak values $V_{zi-ave}$ relative to the band values $P_{zi}$ for wear estimation is obtained, and tire wear amount is estimated using the reference differentiated peak estimated value $V_{zk}$ determined from the approximation formula or the approximation line.

Figure 10:
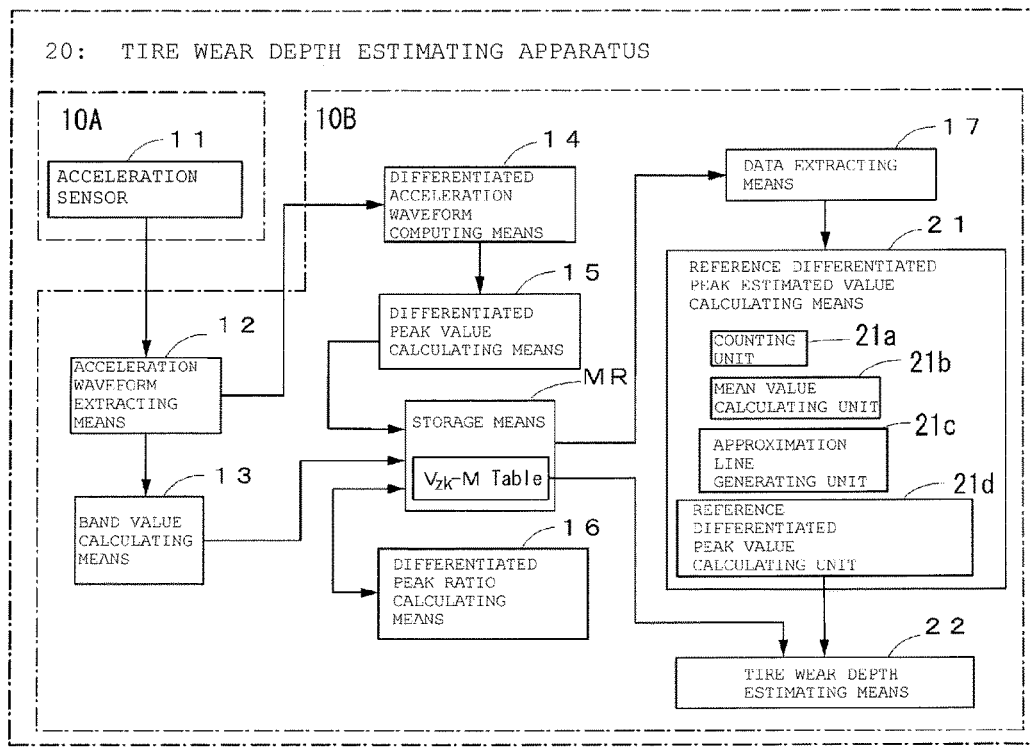
FIG. 10 is a diagram showing a constitution of a tire wear amount estimating apparatus according to a second embodiment of the invention.

FIG. 10 is a diagram showing a constitution of a tire wear amount estimating apparatus 20 according to a second embodiment of the invention. The tire wear amount estimating apparatus 20 includes an acceleration sensor 11, an acceleration waveform extracting means 12, a band value calculating means 13, a differentiated acceleration waveform computing means 14, a differentiated peak value calculating means 15, a differentiated peak ratio calculating means 16, a data extracting means 17, a reference differentiated peak estimated value calculating means 21, a tire wear amount estimating means 22, and a storage means MR.

The respective means from the acceleration sensor 11 to the data extracting means 17 and the storage means MR given the same reference numerals as with the tire wear amount estimating apparatus 10 of the first embodiment are the same as those of the tire wear amount estimating apparatus 10.

The acceleration sensor 11 is disposed at the axial center of an inner liner 2 of the tire 1 in such a manner that the detection direction is the radial direction of the tire. The acceleration sensor 11 detects the radial acceleration of the tire acting on the inner surface of the central part 4 of the tire tread 3.

The acceleration waveform extracting means 12 extracts an acceleration waveform from the signals indicating the magnitudes of radial acceleration of the tire outputted from the acceleration sensor 11.

The differentiated acceleration waveform computing means 14 obtains a differentiated acceleration waveform by temporally differentiating the acceleration waveform extracted by the acceleration waveform extracting means 12.

The differentiated peak value calculating means 15 calculates differentiated peak values, which are the magnitudes of the peaks appearing at the contact patch ends of the differentiated acceleration waveform, from the differentiated acceleration waveform and sends them to the storage means MR.

The differentiated peak ratio calculating means 16 calculates differentiated peak ratios ($R=V_f/V_k$), which are each a ratio between the leading-end differentiated peak value $V_f$ and the trailing-end differentiated peak value $V_k$ stored in the storage means MR, and sends them to the storage means MR.

The data extracting means 17 extracts only leading-end differentiated peak values $V_f$, having the differentiated peak ratio $R=V_f/V_k$ within a range of 0.6 to 1.2, out of the leading-end differentiated peak values $V_f$ calculated by the differentiated peak value calculating means 15 and stored in the storage means MR and sends them as the leading-end differentiated peak values $V_z$ for wear estimation to the storage means MR. At the same time, the data extracting means 17 sends the pre-leading-end band values P, which are calculated from the acceleration waveform before the differentiation of the differentiated peak values $V_z$ for wear estimation, out of the pre-leading-end band values P calculated by the band value calculating means 13 and stored in the storage means MR, as the band values $P_z$ for wear estimation to the storage means MR.

The reference differentiated peak estimated value calculating means 21 includes a counting unit 21a for counting the differentiated peak values $V_z$ for wear estimation stored in the storage means MR for each of the pre-leading-end band values $P_z$, a mean value calculating unit 21b for calculating mean differentiated peak values, which are the mean values of the differentiated peak values for wear estimation, an approximation line generating unit 21c, and a reference differentiated peak estimated value calculating unit 21d.

The counting unit 21a takes the band values $P_z$ for wear estimation as discrete band values $P_{zi}$ (i=1 to n) for wear estimation having a predefined level width $\Delta$ and counts the differentiated peak values $V_z$ for wear estimation corresponding to the band values $P_z$ for wear estimation within the domains of $[P_{zi}-\Delta/2, P_{zi}+\Delta/2]$ centered around the discrete band values $P_{zi}$ for wear estimation as the differentiated peak values $V_{zi\,j}$ for wear estimation corresponding to the band values $P_{zi}$ for wear estimation.

The mean value calculating unit 21b calculates a mean differentiated peak value $V_{zi\text{-}ave}$, which is a mean value of N units of differentiated peak values $V_{zi\,j}$, when the number of differentiated peak values $V_{zi\,j}$ counted reaches a predetermined number N. Here $V_{zi\text{-}ave}=(V_{zi1}+V_{zi2}+\ldots+V_{zij}+\ldots+V_{ziN})$.

The mean differentiated peak value $V_{zi\text{-}ave}$ is calculated for each of the pre-leading-end band values $P_{zi}$.

The approximation line generating unit 21c generates an approximation line representing a relationship between the pre-leading-end band values $P_{zi}$ and the mean differentiated peak values $V_{i\text{-}ave}$ by creating a graph plotting the pre-leading-end band values $P_{zi}$ and the mean differentiated peak values $V_{i\text{-}ave}$ on the horizontal axis for pre-leading-end band values $P_i$ and the vertical axis for mean differentiated peak values $V_{i\text{-}ave}$.

Figure 11A:
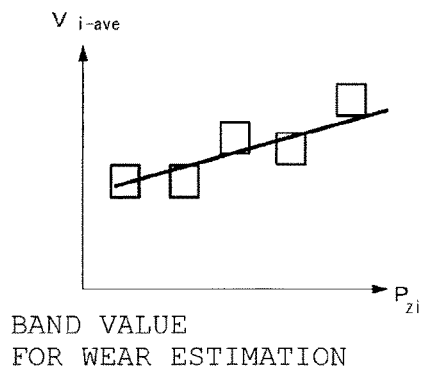
FIGS. 11A and 11B are diagrams for explaining a method for calculating a reference differentiated peak estimated value.

To generate an approximation line, a linear regression line for the pre-leading-end band values $P_{zi}$ and the mean differentiated peak values $V_{iz\text{-}ave}$ may be obtained using a known method of least squares, for instance. And it may be used as the approximation line as shown in FIG. 11A.

Figure 11B:
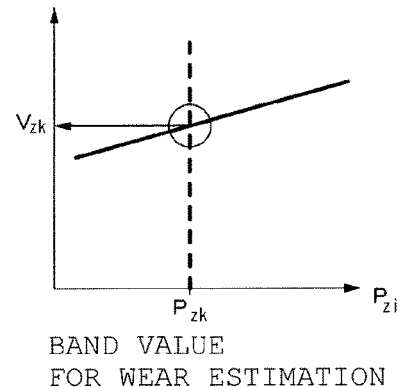

The reference differentiated peak estimated value calculating unit 21d, as shown in FIG. 11b, draws an approximation line in the above-mentioned graph, at the same time calculates a mean differentiated peak value $V_{zk}$ on the approximation line corresponding to a predetermined reference pre-leading-end band value $P_{zk}$, and outputs the $V_{zk}$ as the reference differentiated peak estimated value $V_{zk}$ to the tire wear amount estimating means 22.

The storage means MR stores not only the pre-leading-end band values P, leading-end differentiated peak values $V_f$, trailing-end differentiated peak values $V_k$, differentiated peak ratios R, leading-end differentiated peak values $V_z$ for wear estimation, and band values $P_z$ for wear estimation, but also a V-M map 20M representing a relationship between predetermined reference differentiated peak values $V_{zk}$ and tire wear amount M.

The tire wear amount estimating means 22 estimates the wear amount of the tire 1 from the reference differentiated peak estimated value $V_{zk}$ calculated by the reference differentiated peak estimated value calculating means 21 and the $V_{zk}$-M map 20M stored in the storage means MR.

Figure 12:
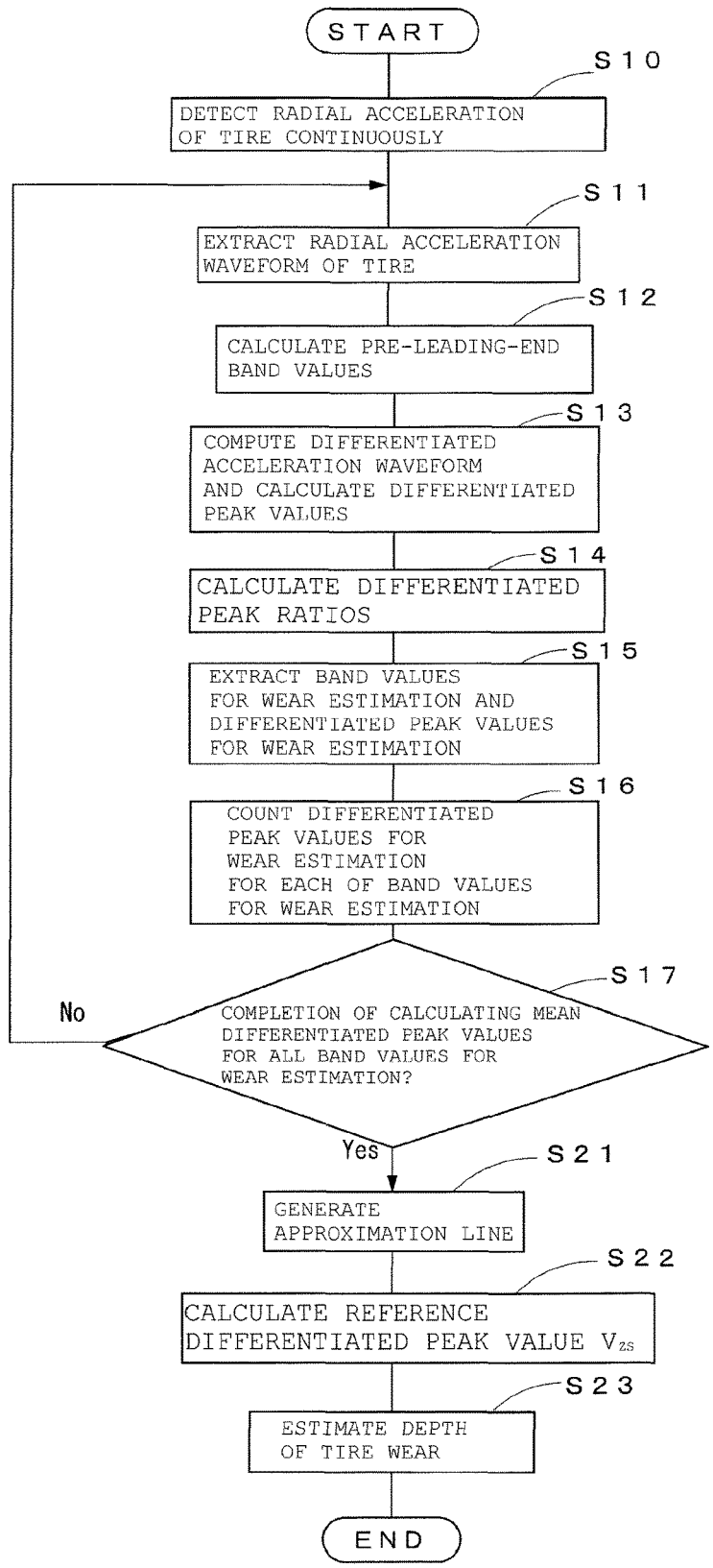
FIG. 12 is a flowchart showing a method for estimating the tire wear amount according to the second embodiment.

Next, a description is given of a method for estimating tire wear amount using a tire wear amount estimating apparatus 20 with reference to the flowchart of FIG. 12.

It is to be noted that the procedure from step S10 "detect radial acceleration of tire" to step S17 of determining whether or not calculation of mean differentiated peak values $V_{zi\text{-}ave}$ is completed are the same as that of the foregoing first embodiment and therefore a description thereof is omitted.

That is, if in step S17, there is any domain $[P_{zi}-\Delta/2, P_{zi}+\Delta/2]$ where the number of differentiated peak values $V_z$ for wear estimation has not reached N (when it is determined that the calculation of mean differentiated peak values $V_{zi\text{-}ave}$ is not completed), the procedure returns to step S11 and the extraction of an acceleration waveform is continued.

Figure 13A:
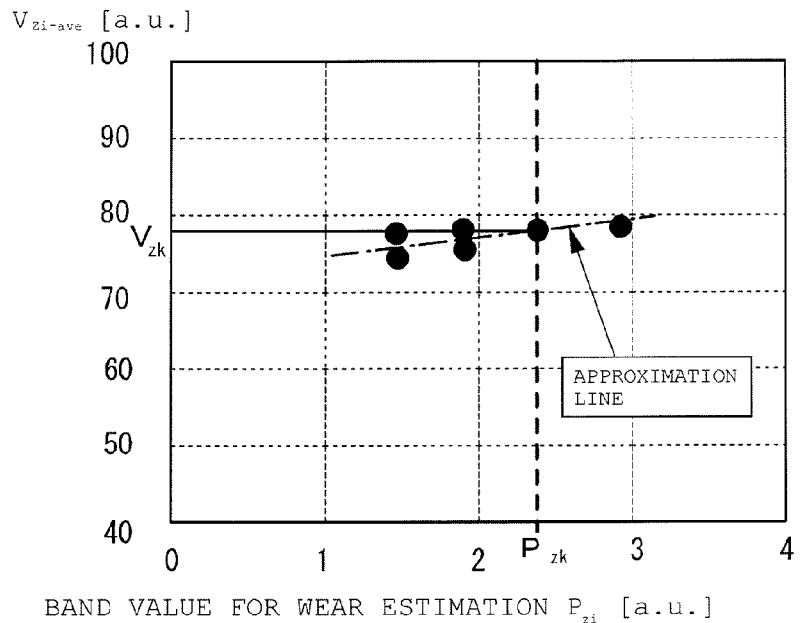
FIGS. 13A and 13B are diagrams showing methods of estimating tire wear amount using an approximation line.

On the other hand, when the calculation of mean differentiated peak values $V_{zi\text{-}ave}$ is completed, the procedure goes to step S21, and an approximation line representing a relationship between pre-leading-end band values $P_{zi}$ and mean differentiated peak values $V_{zi\text{-}ave}$ as shown in FIG. 13A is generated.

Next, a mean differentiated peak value on the approximation line corresponding to a predetermined reference pre-leading-end band value $P_{zk}$ is found, and it is used as the reference differentiated peak estimated value $V_{zk}$ (step S22).

Figure 13B:
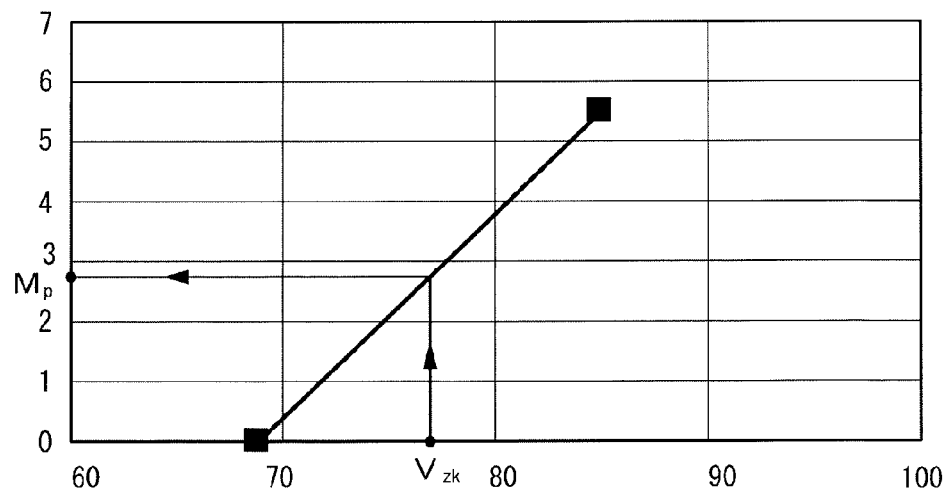

Finally, as shown in FIG. 13B, the wear amount of the tire 1 is estimated from the reference differentiated peak value $V_{zk}$ and the $V_{zk}$-M map 20M stored in the storage means MR (step S23).

It is to be noted that the $V_{zk}$-M map 20M, as with the $V_{zs}$-M map 18M, can be created by obtaining the reference differentiated peak values $V_{zs}$ of various test tires, by causing vehicles to which new tires and worn tires having a plurality of different wear amounts with an acceleration sensor are installed thereon, travel on the road with a variety of road surface conditions.

Also, in the foregoing first and second embodiments, the operation of extracting the differentiated peak values $V_{zi}$ for wear estimation is repeated until the number of differentiated peak values $V_{zi}$ for wear estimation for each of the band values $P_{zi}$ for wear estimation all reaches N. However, the arrangement may be such that the collection of data is stopped at the point when the count of extracted radial acceleration waveforms of the tire has reached $N_0$ (when the number of data of leading-end differentiated peak values $V_f$ and trailing-end differentiated peak values $V_k$ has reached $N_0$). And the leading-end differentiated peak values $V_f$ only, having the differentiated peak ratio $R=V_f/V_k$ within a range of 0.6 to 1.2, are extracted, and these differentiated peak values $V_f$ are used as the leading-end differentiated peak values $V_z$ for wear estimation.

In this case, the number of differentiated peak values $V_{zi}$ for wear estimation for each of the band values $P_{zi}$ for wear estimation is not fixed. However, setting of $N_0$ sufficiently larger than N will prevent any drop in the accuracy of wear amount estimation.

Third Embodiment

Figure 14:
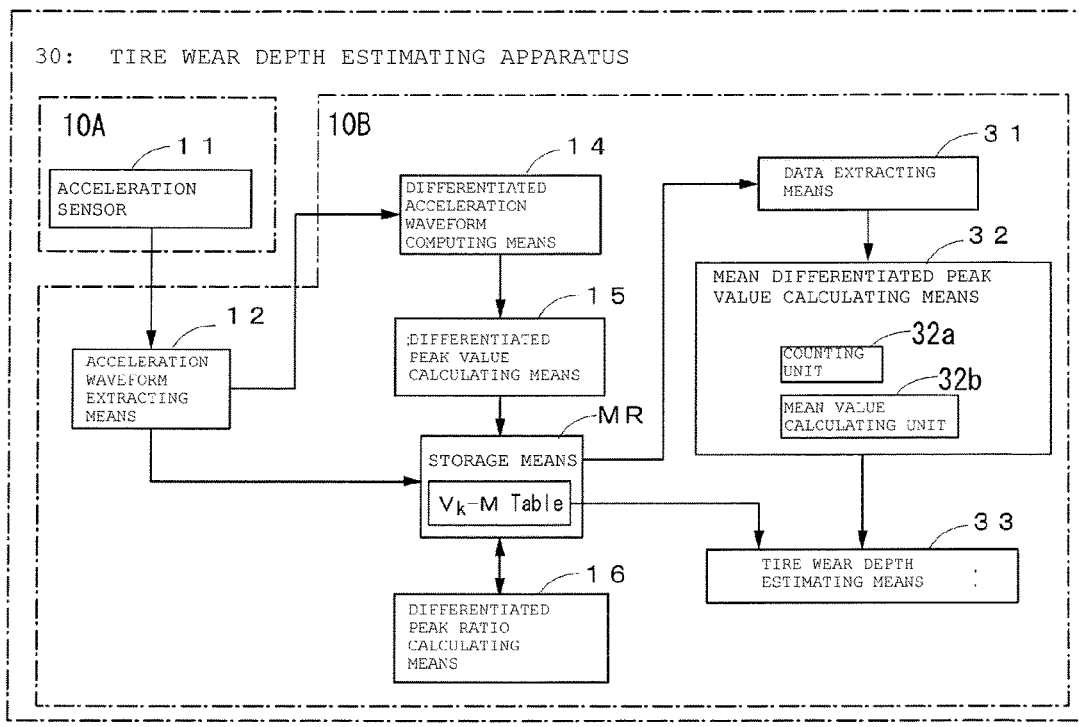
FIG. 14 is a diagram showing a constitution of a tire wear amount estimating apparatus according to a third embodiment of the invention.

In the foregoing first embodiment, tire wear amount is estimated using the band values $P_z$ for wear estimation and the differentiated peak values $V_z$ for wear estimation. However, if a tire wear amount estimating apparatus 30 of a constitution as shown in FIG. 14 is used, then tire wear amount can be estimated using the differentiated peak values $V_z$ for wear estimation only.

The tire wear amount estimating apparatus 30 includes an acceleration sensor 11, an acceleration waveform extracting means 12, a differentiated acceleration waveform computing means 14, a differentiated peak value calculating means 15, a differentiated peak ratio calculating means 16, a data extracting means 31, a mean differentiated peak value calculating means 32, a tire wear amount estimating means 33, and a storage means MR.

The respective means from the acceleration sensor 11 to the differentiated peak ratio calculating means 16 and the storage means MR given the same reference numerals as with the tire wear amount estimating apparatus 10 of the first embodiment are the same as those of the tire wear amount estimating apparatus 10.

The acceleration sensor 11 is disposed at the axial center of an inner liner 2 of the tire 1 in such a manner that the detection direction is the radial direction of the tire. The acceleration sensor 11 detects the radial acceleration of the tire acting on the inner surface of the central part 4 of the tire tread 3.

The acceleration waveform extracting means 12 extracts an acceleration waveform from the signals indicating the magnitudes of radial acceleration of the tire outputted from the acceleration sensor 11.

The differentiated acceleration waveform computing means 14 obtains a differentiated acceleration waveform by temporally differentiating the acceleration waveform extracted by the acceleration waveform extracting means 12.

The differentiated peak value calculating means 15 calculates differentiated peak values, which are the magnitudes of the peaks appearing at the contact patch ends of the differentiated acceleration waveform, from the differentiated acceleration waveform and sends them to the storage means MR.

The differentiated peak ratio calculating means 16 calculates differentiated peak ratios ($R=V_f/V_k$), which are each a ratio between the leading-end differentiated peak value $V_f$ and the trailing-end differentiated peak value $V_k$ stored in the storage means MR, and sends them to the storage means MR.

The data extracting means 31 extracts only the leading-end differentiated peak values $V_f$, having the differentiated peak ratio $R=V_f/V_k$ within a range of 0.6 to 1.2, out of the leading-end differentiated peak values $V_f$ calculated by the differentiated peak value calculating means 15 and sends the differentiated peak values $V_f$ as the leading-end differentiated peak values $V_z$ for wear estimation to the storage means MR.

It is to be noted that also usable as differentiated peak values $V_z$ for wear estimation are trailing-end differentiated peak values $V_k$, having the differentiated peak ratio R within a range of 0.6 to 1.2, or computed values, such as the mean values of the leading-end differentiated peak values $V_f$ and the trailing-end differentiated peak values $V_k$, having the differentiated peak ratio R within a range of 0.6 to 1.2.

The mean differentiated peak value calculating means 32 includes a counting unit 32a for counting the differentiated peak values $V_z$ for wear estimation stored in the storage means MR and a mean value calculating unit 32b for calculating a mean value $V_k$ of differentiated peak values $V_z$ for wear estimation.

The counting unit 32a counts the number of differentiated peak values $V_z$ for wear estimation.

The mean value calculating unit 32b calculates a mean differentiated peak value $V_k$, which is a mean value of n units of differentiated peak value $V_{zj}$, when the number of differentiated peak values $V_{zj}$ counted reaches predetermined n, and sends the mean differentiated peak value $V_k$, to the tire wear amount estimating means 33.

Here $V_k=(V_{z1}+V_{z2}+\ldots+V_{zj}+\ldots+V_{zn})$.

The storage means MR stores not only the pre-leading-end band values P, leading-end differentiated peak values $V_f$, trailing-end differentiated peak values $V_k$, differentiated peak ratios R, and leading-end differentiated peak values $V_z$ for wear estimation, but also a $V_k$-M map 30M representing a relationship between predetermined mean differentiated peak values $V_k$ and tire wear amount M.

The tire wear amount estimating means 33 estimates the wear amount of the tire 1 from the mean differentiated peak value $V_k$ calculated by the mean differentiated peak value calculating means 32 and the $V_k$-M map 30M stored in advance in the storage means MR.

It is to be noted that the tire wear amount estimating apparatus 30 may have an estimation accuracy of tire wear amount lower than that of the tire wear amount estimating apparatuses 10 and 20 of the first and second embodiments. However, it has an advantage of simpler constitution of apparatus and fewer number of data to be handled.

Figure 15:
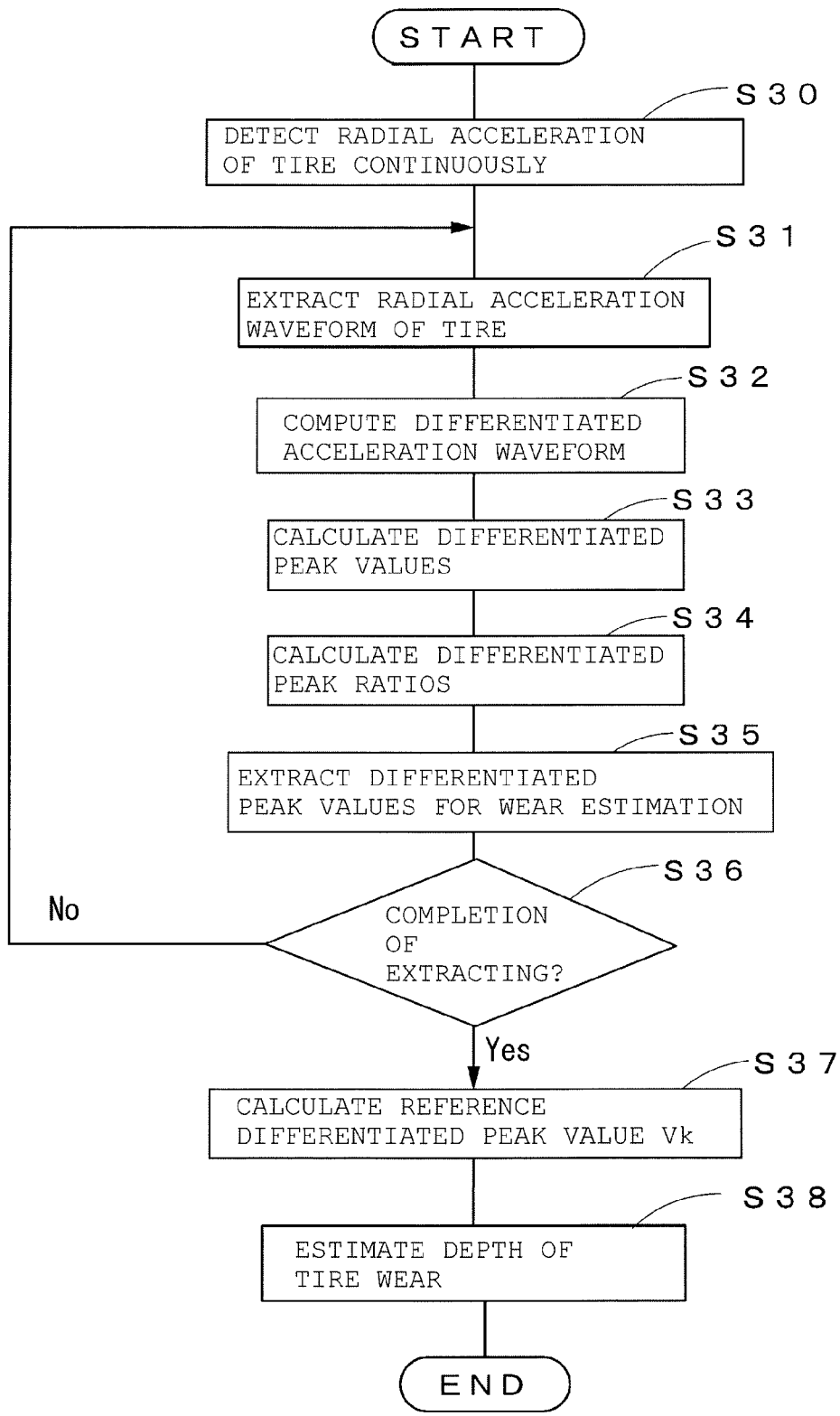
FIG. 15 is a flowchart showing a method for estimating tire wear amount according to the third embodiment.

Next, a description is given of a method for estimating tire wear amount using a tire wear amount estimating apparatus 30 with reference to the flowchart of FIG. 15.

First a radial acceleration of the tire is detected by an acceleration sensor 11 (step S30).

Then an acceleration waveform is extracted from the signals indicating the magnitudes of the radial acceleration of the tire (step S31).

Next, a differentiated acceleration waveform is computed by temporally differentiating the acceleration waveform (step S32), and then a leading-end differentiated peak value $V_f$, which is a peak value on the leading-end side of the contact patch, and a trailing-end differentiated peak value $V_k$, which is a peak value on the trailing-end side of the contact patch, are calculated from the differentiated acceleration waveform (step S33).

Then differentiated peak ratios ($R=V_f/V_k$), which are each a ratio between the leading-end differentiated peak values $V_f$ and the trailing-end differentiated peak values $V_k$, are calculated (step S34). After that, only the leading-end differentiated peak values, having the differentiated peak ratios $R=V_f/V_k$ within a range of 0.6 to 1.2, are extracted as the differentiated peak values $V_z$ for wear estimation (step S35).

Next, the differentiated peak values $V_z$ for wear estimation are counted, and it is determined whether the number of the differentiated peak values $V_z$ for wear estimation has reached n or not (step S36).

If the number has reached n, the mean value of the n units of differentiated peak values $V_{zi}$ for wear estimation is calculated, and the mean value is employed as the reference differentiated peak value $V_k$ (step S37).

On the other hand, when the number of differentiated peak values has not reached the predetermined number n, the procedure returns to step S31, and the extraction of an acceleration waveform is continued.

Finally, the wear amount of the tire tread is estimated from the reference differentiated peak value $V_k$ and the $V_k$-M map stored in advance in the storage means MR (step S38).

It is to be noted that as with the first embodiment, the arrangement may be such that the mean differentiated peak value $V_k$ and a predetermined threshold value K or a plurality of threshold values $K_1$ and $K_2$ ($K_1<K_2$) are set, and the tread wear amount of the tire 1 is estimated by comparing the threshold value K or threshold values $K_1$ and $K_2$ against the calculated mean differentiated peak value $V_k$.

Thus far, the invention has been described with reference to preferred embodiments. However, it should be evident to those skilled in the art that the technical scope of the invention is not limited to the scope of the embodiments described and that various modifications and variations can be made to this invention without departing from the scope and spirit of the invention. Accordingly, the invention is intended to include all such modifications and variations as fall within the scope of the appended claims.

(1) The present invention provides a tire wear amount estimating method for estimating a tire tread wear amount from a radial acceleration of a tire detected using an acceleration sensor. The method includes the steps of (A) detecting the radial acceleration of the tire using the acceleration sensor disposed on an inner surface of a tire tread, (B) extracting a radial acceleration waveform of the tire covering a neighborhood of contact patch from the detected radial acceleration, (C) obtaining a differentiated acceleration waveform by differentiating the radial acceleration waveform of the tire, (D) calculating a leading-end differentiated peak value and a trailing-end differentiated peak value, which are the magnitudes of peaks appearing at the two contact patch ends of the differentiated acceleration waveform, from the differentiated acceleration waveform, (E) calculating a differentiated peak ratio, which is a ratio between the leading-end differentiated peak value and the trailing-end differentiated peak value, for each of the leading-end differentiated peak values and the trailing end-side differentiated peak values obtained by repeating the steps (A) to (D) a plurality of times, and extracting either one of the leading-end differentiated peak values and the trailing-end differentiated peak values, having the differentiated peak ratio within a lower limit range of 0.6 to 0.8 and an upper limit range of 1.0 to 1.2, or computed values of the leading-end differentiated peak values and trailing-end differentiated peak values, as differentiated peak values for wear estimation, (F) calculating a mean differentiated peak value, which is a mean value of a plurality of differentiated peak values for wear estimation extracted in step (E), and (G) estimating the tire wear amount from the mean differentiated peak value.

In this manner, tire wear amount is estimated using only the data with the differentiated peak ratios, which are each the ratio between the leading-end differentiated peak value and the trailing-end differentiated peak value, within a range of 0.6 to 1.2. As a result, tire wear amount can be estimated with excellent accuracy even on snow-covered road surfaces.

(2) Also, in step (G), the tire wear amount is estimated from the mean differentiated peak value and a map representing a relationship between predetermined mean differentiated peak values and tire wear amount. Hence, the accuracy in estimation of tire wear amount is further improved.

(3) Also, the tire wear amount may be estimated by comparing the mean differentiated peak value with predetermined threshold values. In this manner, the accuracy in estimation of tire wear amount can be further improved.

(4) Also, the present invention provides a tire wear amount estimating method for estimating a tire tread wear amount from a radial acceleration of a tire detected using an acceleration sensor. The method includes the steps of (a) detecting the radial acceleration of the tire using the acceleration sensor disposed on an inner surface of a tire tread, (b) extracting a radial acceleration waveform of the tire covering a neighborhood of contact patch from the detected radial acceleration, (c) calculating a pre-leading-end band value, which is a vibration level of a predetermined specific frequency band, from a waveform in a pre-leading-end domain of the radial acceleration waveform of the tire, (d) obtaining a differentiated acceleration waveform by differentiating the radial acceleration waveform of the tire, (e) calculating a leading-end differentiated peak value and a trailing-end differentiated peak value, which are the magnitudes of peaks appearing at the two contact patch ends of the differentiated acceleration waveform, from the differentiated acceleration waveform, (f) calculating a differentiated peak ratio ($R=V_F/V_k$), which is a ratio between the leading-end differentiated peak value and the trailing-end differentiated peak value, for each of the leading-end differentiated peak values and the trailing end-side differentiated peak values obtained by repeating the steps (a) to (e) a plurality of times, and extracting either one of the leading-end differentiated peak values and the trailing-end differentiated peak values, having the differentiated peak ratio R within a lower limit range of 0.6 to 0.8 and an upper limit range of 1.0 to 1.2, or computed values of the leading-end differentiated peak values and trailing-end differentiated peak values, as differentiated peak values $V_z$ for wear estimation, and (g) estimating the tire wear amount from a plurality of differentiated peak values $V_z$ for wear estimation extracted in step (f). And in step (f), a differentiated peak value for wear estimation is extracted for each of the band values for wear estimation, and in step (g), a mean differentiated peak value, which is a mean value of the differentiated peak values $V_z$ for wear estimation obtained for each of the band values $P_z$ for wear estimation, is calculated for each of the differentiated peak values for wear estimation, and then the mean value of the calculated mean differentiated peak values or a mean differentiated peak value corresponding to a predetermined reference pre-leading-end band value is calculated, and using this as the reference differentiated peak value $V_{zs}$, the tire wear amount is estimated from the reference differentiated peak value $V_{zs}$.

In this manner, a mean value of the differentiated peak values for wear estimation is obtained for each of the band levels, and at the same time, a mean value of the mean differentiated peak values or a mean differentiated peak value corresponding to a predetermined reference pre-leading-end band value is used as the reference differentiated peak value. And the tire wear amount is estimated from the calculated reference differentiated peak value. As a result, tire wear amount can be estimated with excellent accuracy even on snow-covered road surfaces.

(5) Also, in step (g), the tire wear amount is estimated from the reference differentiated peak value and a map representing a relationship between predetermined reference differentiated peak values and tire wear amount. Hence, the accuracy in estimation of tire wear amount is further improved.

(6) Also, the tire wear amount may be estimated by comparing the reference differentiated peak value with predetermined threshold values. In this manner, the accuracy in estimation of tire wear amount can be further improved.

Note that in counting the differentiated peak values for wear estimation for each of the band values $P_z$ for wear estimation, it goes without saying that, as is practiced generally, the band values $P_z$ for wear estimation are taken as discrete band values $P_{zi}$ having a predefined level width $\Delta$ and the differentiated peak values $V_z$ for wear estimation corresponding to $P_z$ within the domains of $[P_{zi}-\Delta/2, P_{zi}+\Delta/2]$ centered around the discrete band values $P_{zi}$ for wear estimation are counted as the differentiated peak values $V_{zi}$ corresponding to the band values $P_{zi}$ for wear estimation.

(7) Also, the present invention provides a tire wear amount estimating method for estimating a tire tread wear amount from a radial acceleration of a tire detected using an acceleration sensor. The method includes the steps of (a) detecting the radial acceleration of the tire using the acceleration sensor disposed on an inner surface of a tire tread, (b) extracting a radial acceleration waveform of the tire covering a neighborhood of contact patch from the detected radial acceleration, (c) calculating a pre-leading-end band value, which is a vibration level of a predetermined specific frequency band, from the waveform in a pre-leading-end domain of the radial acceleration waveform of the tire, (d) obtaining a differentiated acceleration waveform by differentiating the radial acceleration waveform of the tire, (e) calculating a leading-end differentiated peak value and a trailing-end differentiated peak value, which are the magnitudes of peaks appearing at the two contact patch ends of the differentiated acceleration waveform, from the differentiated acceleration waveform, (f) calculating a differentiated peak ratio, which is a ratio between the leading-end differentiated peak value and the trailing-end differentiated peak value, for each of the leading-end differentiated peak values and the trailing end-side differentiated peak values obtained by repeating the steps (a) to (e) a plurality of times, and extracting either one of the leading-end differentiated peak values and the trailing-end differentiated peak values, having the differentiated peak ratio within a lower limit range of 0.6 to 0.8 and an upper limit range of 1.0 to 1.2, or computed values of the leading-end differentiated peak values and trailing-end differentiated peak values, as differentiated peak values for wear estimation, (h) obtaining an approximation formula representing a relationship between the band values for wear estimation and the differentiated peak values for wear estimation from the plurality of band values for wear estimation and differentiated peak values for wear estimation extracted in step (f), or an approximation line to be derived by plotting the differentiated peak values for wear estimation relative to the band values for wear estimation, (i) calculating a reference differentiated peak estimated value, which is a differentiated peak value for wear estimation corresponding to the predetermined reference pre-leading-end band value, from the approximation formula or approximation line, and (j) estimating the tire wear amount from the calculated reference differentiated peak estimated value. And in step (f), a differentiated peak value for wear estimation is extracted for each of the band values for wear estimation.

In this manner, tire wear amount is estimated using a reference differentiated peak estimated value calculated using an approximation formula or an approximation line, as substitute for the reference differentiated peak value of (4) above. As a result, the accuracy in estimation of tire wear amount can be surely improved even on snow-covered road surfaces.

(8) Also, in step (j), the tire wear amount is estimated from the reference differentiated peak estimated value and a map representing a relationship between predetermined reference differentiated peak values and tire wear amount. Hence, the accuracy in estimation of tire wear amount is further improved.

(9) Also, the tire wear amount may be estimated by comparing the reference differentiated peak estimated value with predetermined threshold values. In this manner, the accuracy in estimation of tire wear amount can be further improved.

(10) Also, the present invention provides a tire wear amount estimating apparatus for estimating a tire tread wear amount from a radial acceleration of a tire detected using an acceleration sensor. The apparatus includes the acceleration sensor disposed on an inner surface of a tire tread for detecting the radial acceleration of the tire, an acceleration waveform extracting means for extracting a radial acceleration waveform of the tire covering a neighborhood of contact patch from the output signals of the acceleration sensor, a differentiation computing means for obtaining a differentiated acceleration waveform by differentiating the radial acceleration waveform of the tire, a differentiated peak value calculating means for calculating a leading-end differentiated peak value and a trailing-end differentiated peak value, which are the peak values at the two contact patch ends of the differentiated acceleration waveform, a differentiated peak ratio calculating means for calculating a differentiated peak ratio, which is a ratio between the leading-end differentiated peak value and the trailing-end differentiated peak value, a data extracting means for extracting either one of the leading-end differentiated peak values and the trailing-end differentiated peak values, having the differentiated peak ratio within a lower limit range of 0.6 to 0.8 and an upper limit range of 1.0 to 1.2, out of the calculated leading-end differentiated peak values and trailing-end differentiated peak values, or computed values of the leading-end differentiated peak values and trailing-end differentiated peak values, as differentiated peak values for wear estimation, a mean differentiated peak value calculating means for calculating a mean differentiated peak value, which is a mean value of the differentiated peak values for wear estimation, a storage means for storing a map representing a relationship between predetermined mean differentiated peak values and tire wear amount, and a tire wear amount estimating means for estimating the tire wear amount from the calculated mean differentiated peak value and the map.

By employing a constitution as described above, a tire wear amount estimating apparatus featuring high estimation accuracy even on snow-covered road surfaces can be realized.

(11) Also, the present invention provides a tire wear amount estimating apparatus for estimating a tire tread wear amount from a radial acceleration of a tire detected using an acceleration sensor. The apparatus includes the acceleration sensor disposed on an inner surface of a tire tread for detecting the radial acceleration of the tire, an acceleration waveform extracting means for extracting a radial acceleration waveform of the tire covering a neighborhood of contact patch from the output signals of the acceleration sensor, a band value calculating means for calculating pre-leading-end band values, which are vibration levels of predetermined specific frequency bands, from a waveform in a pre-leading-end domain of the radial acceleration waveform of the tire, a differentiation computing means for obtaining a differentiated acceleration waveform by differentiating the radial acceleration waveform of the tire, a differentiated peak value calculating means for calculating a leading-end differentiated peak value and a trailing-end differentiated peak value, which are the peak values at the two contact patch ends of the differentiated acceleration waveform, a differentiated peak ratio calculating means for calculating a differentiated peak ratio, which is a ratio between the leading-end differentiated peak value and the trailing-end differentiated peak value, a data extracting means for extracting either one of the leading-end differentiated peak values and the trailing-end differentiated peak values, having the differentiated peak ratio within a lower limit range of 0.6 to 0.8 and an upper limit range of 1.0 to 1.2, out of the calculated leading-end differentiated peak values and trailing-end differentiated peak values, or computed values of the leading-end differentiated peak values and trailing-end differentiated peak values, as differentiated peak values for wear estimation and at the same time extracting band values for wear estimation, which are pre-leading-end band values calculated together with the differentiated peak values for wear estimation out of the calculated leading-end band values, a mean differentiated peak value calculating means for calculating a mean differentiated peak value, which is a mean value of the extracted differentiated peak values for wear estimation, for each of the band values for wear estimation, a reference differentiated peak value calculating means for calculating a reference differentiated peak value from the calculated mean differentiated peak value, a storage means for storing a map representing a relationship between predetermined reference differentiated peak values and tire wear amount, and a wear amount estimating means for estimating the tire wear amount from the calculated mean reference differentiated peak value and the map. And the reference differentiated peak value employed is the mean value of the mean differentiated peak values or the mean differentiated peak value corresponding to the predetermined reference pre-leading-end band value.

In this manner, pre-leading-end band values are calculated by a band value calculating means added to the tire wear amount estimating apparatus as described in (10) above. At the same time, a differentiated peak value for wear estimation is extracted for each of pre-leading-end band values, a mean value of the differentiated peak values for wear estimation is obtained for each of the pre-leading-end band values, and the mean value of the differentiated peak values for each of the pre-leading-end band values is used in estimating the tire wear amount. Hence, the accuracy in estimation of tire wear amount is further improved.

(12) Also, the present invention provides a tire wear amount estimating apparatus for estimating a tire tread wear amount from a radial acceleration of a tire detected using an acceleration sensor. The apparatus includes the acceleration sensor disposed on an inner surface of a tire tread for detecting the radial acceleration of the tire, an acceleration waveform extracting means for extracting a radial acceleration waveform of the tire covering a neighborhood of contact patch from the output signals of the acceleration sensor, a band value calculating means for calculating pre-leading-end band values, which are vibration levels of predetermined specific frequency bands, from a waveform in a pre-leading-end domain of the radial acceleration waveform of the tire, a differentiation computing means for obtaining a differentiated acceleration waveform by differentiating the radial acceleration waveform of the tire, a differentiated peak value calculating means for calculating a leading-end differentiated peak value and a trailing-end differentiated peak value, which are the peak values at the two contact patch ends of the differentiated acceleration waveform, a differentiated peak ratio calculating means for calculating a differentiated peak ratio, which is a ratio between the leading-end differentiated peak value and the trailing-end differentiated peak value, a data extracting means for extracting either one of the leading-end differentiated peak values and the trailing-end differentiated peak values, having the differentiated peak ratio within a lower limit range of 0.6 to 0.8 and an upper limit range of 1.0 to 1.2, out of the calculated leading-end differentiated peak values and trailing-end differentiated peak values, or computed values of the leading-end differentiated peak values and trailing-end differentiated peak values, as differentiated peak values for wear estimation and at the same time extracting band values for wear estimation, which are the pre-leading-end band values calculated together with the differentiated peak values for wear estimation out of the calculated leading-end band values, a mean differentiated peak value calculating means for calculating a mean differentiated peak value, which is a mean value of the extracted differentiated peak values for wear estimation, a reference differentiated peak estimated value calculating means for obtaining an approximation formula representing a relationship between the band values for wear estimation and the mean differentiated peak values from the band values for wear estimation and the mean differentiated peak values or an approximation line to be derived by plotting the mean differentiated peak values relative to the band values for wear estimation and calculating a reference differentiated peak estimated value, which is a mean differentiated peak value corresponding to the predetermined reference pre-leading-end band values, from the approximation formula or the approximation line, a storage means for storing a map representing a relationship between predetermined reference differentiated peak estimated values and tire wear amount, and a wear amount estimating means for estimating the tire wear amount from the calculated reference differentiated peak estimated value and the map.

In this manner, a reference differentiated peak estimated value calculating means is provided as substitute for the reference differentiated peak value calculating means as described in (11) above. And a reference differentiated peak estimated value is calculated, and the calculated reference differentiated peak estimated value is used in estimating the tire wear amount. As a result, the accuracy in estimation of tire wear amount can be surely improved even on snow-covered road surfaces.

DESCRIPTION OF REFERENCE NUMERALS 1 tire
2 inner liner
3 tire tread
4 central region
5 wheel
10 tire wear amount estimating apparatus
10A sensor unit
10B storage and computing unit
11 acceleration sensor
11F transmitter
12 acceleration waveform extracting means
13 band value calculating means
14 differentiated acceleration waveform computing means
15 differentiated peak value calculating means
16 differentiated peak ratio calculating means
17 data extracting means
18 reference differentiated peak value calculating means
18a counting unit
18b mean value calculating unit
18c reference differentiated peak value calculating unit
19 tire wear amount estimating means
MR storage means
10M $V_{zs}$-M map

The invention claimed is:
1. A tire wear amount estimating method for estimating a tire tread wear amount from a radial acceleration of a tire detected using an acceleration sensor, the method comprising the steps of:

(A) detecting the radial acceleration of the tire using the acceleration sensor disposed on an inner surface of a tire tread;
(B) extracting a radial acceleration waveform of the tire covering a neighborhood of contact patch from the detected radial acceleration;
(C) obtaining a differentiated acceleration waveform by differentiating the radial acceleration waveform of the tire;
(D) calculating a leading-end differentiated peak value and a trailing-end differentiated peak value, which are magnitudes of peaks appearing at two contact patch ends of the differentiated acceleration waveform, from the differentiated acceleration waveform;
(E) calculating a differentiated peak ratio, which is a ratio between the leading-end differentiated peak value and the trailing-end differentiated peak value, for each of the leading-end differentiated peak values and the trailing-end differentiated peak values obtained by repeating the steps (A) to (D) a plurality of times, and extracting either one of the leading-end differentiated peak values and the trailing-end differentiated peak values, having the differentiated peak ratio within a lower limit range of 0.6 to 0.8 and an upper limit range of 1.0 to 1.2, or computed values of the leading-end differentiated peak values and the trailing-end differentiated peak values, as differentiated peak values for wear estimation;
(F) calculating a mean differentiated peak value, which is a mean value of the plurality of differentiated peak values for wear estimation extracted in step (E); and
(G) estimating the tire wear amount from the mean differentiated peak value.

2. The tire wear amount estimating method of claim 1, wherein in step (G), the tire wear amount is estimated from the mean differentiated peak value and a map representing a relationship between predetermined mean differentiated peak values and tire wear amounts.

3. The tire wear amount estimating method of claim 1, wherein in step (G), the tire wear amount is estimated by comparing the mean differentiated peak value with predetermined threshold values.

4. A tire wear amount estimating method for estimating a tire tread wear amount from a radial acceleration of a tire detected using an acceleration sensor, the method comprising the steps of:
(a) detecting the radial acceleration of the tire using the acceleration sensor disposed on an inner surface of a tire tread;
(b) extracting a radial acceleration waveform of the tire covering a neighborhood of contact patch from the detected radial acceleration;
(c) calculating a pre-leading-end band value, which is a vibration level of a predetermined specific frequency band, from a waveform in a pre-leading-end domain of the radial acceleration waveform of the tire;
(d) obtaining a differentiated acceleration waveform by differentiating the radial acceleration waveform of the tire;
(e) calculating a leading-end differentiated peak value and a trailing-end differentiated peak value, which are magnitudes of peaks appearing at two contact patch ends of the differentiated acceleration waveform, from the differentiated acceleration waveform;
(f) calculating a differentiated peak ratio, which is a ratio between the leading-end differentiated peak value and the trailing-end differentiated peak value, for each of the leading-end differentiated peak values and the trailing end-side differentiated peak values obtained by repeating the steps (a) to (e) a plurality of times, and extracting either one of the leading-end differentiated peak values and the trailing-end differentiated peak values, having the differentiated peak ratio within a lower limit range of 0.6 to 0.8 and an upper limit range of 1.0 to 1.2, or computed values of the leading-end differentiated peak values and the trailing-end differentiated peak values, as differentiated peak values for wear estimation; and
(g) estimating the tire wear amount from the plurality of differentiated peak values for wear estimation extracted in step (f),
wherein in step (f), the differentiated peak value for wear estimation is extracted for each of the band values for wear estimation, and
wherein in step (g), a mean differentiated peak value, which is a mean value of the differentiated peak values for wear estimation obtained for each of the band values for wear estimation, is calculated for each of the differentiated peak values for wear estimation, and then a mean value of the calculated mean differentiated peak values or a mean differentiated peak value corresponding to a predetermined reference pre-leading-end band value is calculated to be used as a reference differentiated peak value, and the tire wear amount is estimated from the reference differentiated peak value.

5. The tire wear amount estimating method of claim 4, wherein in step (g), the tire wear amount is estimated from the reference differentiated peak value and a map representing a relationship between predetermined reference differentiated peak values and tire wear amount.

6. The tire wear amount estimating method of claim 4, wherein in step (g), the tire wear amount is estimated by comparing the reference differentiated peak value with predetermined threshold values.

7. A tire wear amount estimating method for estimating a tire tread wear amount from a radial acceleration of a tire using an acceleration sensor, the method comprising the steps of:
(a) detecting the radial acceleration of the tire using the acceleration sensor disposed on an inner surface of a tire tread;
(b) extracting a radial acceleration waveform of the tire covering a neighborhood of contact patch from the detected radial acceleration;
(c) calculating a pre-leading-end band value, which is a vibration level of a predetermined specific frequency band, from a waveform in a pre-leading-end domain of the radial acceleration waveform of the tire;
(d) obtaining a differentiated acceleration waveform by differentiating the radial acceleration waveform of the tire;
(e) calculating a leading-end differentiated peak value and a trailing-end differentiated peak value, which are magnitudes of peaks appearing at two contact patch ends of the differentiated acceleration waveform, from the differentiated acceleration waveform;
(f) calculating a differentiated peak ratio, which is a ratio between the leading-end differentiated peak value and the trailing-end differentiated peak value, for each of the leading-end differentiated peak values and the trailing-end differentiated peak values obtained by repeating the steps (a) to (e) a plurality of times, and extracting either one of the leading-end differentiated peak values and the trailing-end differentiated peak values, having the differentiated peak ratio within a lower limit range of 0.6 to 0.8 and an upper limit range of 1.0 to 1.2, or computed values of the leading-end differentiated peak values and the trailing-end differentiated peak values, as differentiated peak values for wear estimation;

(h) obtaining an approximation formula representing a relationship between band values for wear estimation and the differentiated peak values for wear estimation from the plurality of band values for wear estimation and the differentiated peak values for wear estimation extracted in step (f), or an approximation line to be derived by plotting the differentiated peak values for wear estimation relative to the band values for wear estimation;

(i) calculating a reference differentiated peak estimated value, which is a differentiated peak value for wear estimation corresponding to a predetermined reference pre-leading-end band value, from the approximation formula or the approximation line; and (j) estimating the tire wear amount from the calculated reference differentiated peak estimated value, wherein in step (f), the differentiated peak value for wear estimation is extracted for each of the band values for wear estimation.

8. The tire wear amount estimating method of claim 7, wherein in step (j), the tire wear amount is estimated from the reference differentiated peak estimated value and a map representing a relationship between predetermined reference differentiated peak values and tire wear amount.

9. The tire wear amount estimating method of claim 7, wherein in step (j), the tire wear amount is estimated by comparing the reference differentiated peak estimated value with predetermined threshold values.

10. A tire wear amount estimating apparatus for estimating a tire tread wear from a radial acceleration of a tire detected using an acceleration sensor, the apparatus comprising:

the acceleration sensor disposed on an inner surface of a tire tread for detecting the radial acceleration of the tire;

an acceleration waveform extracting means for extracting a radial acceleration waveform of the tire covering a neighborhood of contact patch from output signals of the acceleration sensor;

a differentiation computing means for obtaining a differentiated acceleration waveform by differentiating the radial acceleration waveform of the tire;

a differentiated peak value calculating means for calculating a leading-end differentiated peak value and a trailing-end differentiated peak value, which are peak values at two contact patch ends of the differentiated acceleration waveform;

a differentiated peak ratio calculating means for calculating a differentiated peak ratio, which is a ratio between the leading-end differentiated peak value and the trailing-end differentiated peak value;

a data extracting means for extracting either one of the leading-end differentiated peak values and the trailing-end differentiated peak values, having the differentiated peak ratio within a lower limit range of 0.6 to 0.8 and an upper limit range of 1.0 to 1.2, out of the calculated leading-end differentiated peak values and the trailing-end differentiated peak values, or computed values of the leading-end differentiated peak values and the trailing-end differentiated peak values, as differentiated peak values for wear estimation;

a mean differentiated peak value calculating means for calculating a mean differentiated peak value, which is a mean value of the differentiated peak values for wear estimation;

a storage means for storing a map representing a relationship between predetermined mean differentiated peak values and tire wear amount; and a tire wear amount estimating means for estimating the tire wear amount from the calculated mean differentiated peak value and the map.

11. A tire wear amount estimating apparatus for estimating a tire tread wear amount from a radial acceleration of a tire detected using an acceleration sensor, the apparatus comprising:

the acceleration sensor disposed on an inner surface of a tire tread for detecting the radial acceleration of the tire;

an acceleration waveform extracting means for extracting a radial acceleration waveform of the tire covering a neighborhood of contact patch from output signals of the acceleration sensor;

a band value calculating means for calculating pre-leading-end band values, which are vibration levels of predetermined specific frequency bands, from a waveform in a pre-leading-end domain of the radial acceleration waveform of the tire;

a differentiation computing means for obtaining a differentiated acceleration waveform by differentiating the radial acceleration waveform of the tire;

a differentiated peak value calculating means for calculating a leading-end differentiated peak value and a trailing-end differentiated peak value, which are peak values at two contact patch ends of the differentiated acceleration waveform;

a differentiated peak ratio calculating means for calculating a differentiated peak ratio, which is a ratio between the leading-end differentiated peak value and the trailing-end differentiated peak value;

a data extracting means for extracting either one of the leading-end differentiated peak values and the trailing-end differentiated peak values, having the differentiated peak ratio within a lower limit range of 0.6 to 0.8 and an upper limit range of 1.0 to 1.2, out of the calculated leading-end differentiated peak values and the trailing-end differentiated peak values, or computed values of the leading-end differentiated peak values and the trailing-end differentiated peak values, as differentiated peak values for wear estimation and at the same time extracting band values for wear estimation, which are pre-leading-end band values calculated together with the differentiated peak values for wear estimation out of the calculated leading-end band values;

a mean differentiated peak value calculating means for calculating, for each of the band values for wear estimation, a mean differentiated peak value, which is a mean value of the extracted differentiated peak values for wear estimation;

a reference differentiated peak value calculating means for calculating a reference differentiated peak value from the calculated mean differentiated peak value;

a storage means for storing a map representing a relationship between predetermined reference differentiated peak values and tire wear amount; and a wear amount estimating means for estimating the tire wear amount from the calculated mean reference differentiated peak value and the map, wherein the reference differentiated peak value is a mean value of the mean differentiated peak values or a mean differentiated peak value corresponding to a predetermined reference pre-leading-end band value.

12. A tire wear amount estimating apparatus for estimating a tire tread wear amount from a radial acceleration of a tire detected using an acceleration sensor, the apparatus comprising:

the acceleration sensor disposed on an inner surface of a tire tread for detecting the radial acceleration of the tire;

an acceleration waveform extracting means for extracting a radial acceleration waveform of the tire covering a neighborhood of contact patch from output signals of the acceleration sensor;

a band value calculating means for calculating pre-leading-end band values, which are vibration levels of predetermined specific frequency bands, from a waveform in a pre-leading-end domain of the radial acceleration waveform of the tire;

a differentiation computing means for obtaining a differentiated acceleration waveform by differentiating the radial acceleration waveform of the tire;

a differentiated peak value calculating means for calculating a leading-end differentiated peak value and a trailing-end differentiated peak value, which are peak values at two contact patch ends of the differentiated acceleration waveform;

a differentiated peak ratio calculating means for calculating a differentiated peak ratio, which is a ratio between the leading-end differentiated peak value and the trailing-end differentiated peak value;

a data extracting means for extracting either one of the leading-end differentiated peak values and the trailing-end differentiated peak values, having the differentiated peak ratio within a lower limit range of 0.6 to 0.8 and an upper limit range of 1.0 to 1.2, out of the calculated leading-end differentiated peak values and the trailing-end differentiated peak values, or computed values of the leading-end differentiated peak values and trailing-end differentiated peak values, as differentiated peak values for wear estimation and at the same time extracting band values for wear estimation, which are the pre-leading-end band values calculated together with the differentiated peak values for wear estimation out of the calculated leading-end band values;

a mean differentiated peak value calculating means for calculating a mean differentiated peak value, which is a mean value of the extracted differentiated peak values for wear estimation, for each of the band values for wear estimation;

a reference differentiated peak estimated value calculating means for obtaining an approximation formula representing a relationship between the band values for wear estimation and the mean differentiated peak values from the band values for wear estimation and the mean differentiated peak values or an approximation line to be derived by plotting the mean differentiated peak values relative to the band values for wear estimation and calculating a reference differentiated peak estimated value, which is a mean differentiated peak value corresponding to predetermined reference pre-leading-end band values, from the approximation formula or the approximation line;

a storage means for storing a map representing a relationship between predetermined reference differentiated peak estimated values and tire wear amount; and a wear amount estimating means for estimating the tire wear amount from the calculated reference differentiated peak estimated value and the map.

* * * * *